(12) United States Patent
McDonald

(10) Patent No.: US 10,540,535 B2
(45) Date of Patent: Jan. 21, 2020

(54) AUTOMATICALLY IDENTIFYING REGIONS OF INTEREST ON IMAGES OF BIOLOGICAL CELLS

(71) Applicant: Carl Zeiss Microscopy GmbH, Jena (DE)

(72) Inventor: Jeffrey Scott McDonald, Laytonsville, MD (US)

(73) Assignee: CARL ZEISS MICROSCOPY GMBH, Jena (DE)

( * ) Notice: Subject to any disclaimer, the term of this patent is extended or adjusted under 35 U.S.C. 154(b) by 55 days.

(21) Appl. No.: 15/919,100

(22) Filed: Mar. 12, 2018

(65) Prior Publication Data

US 2018/0260604 A1    Sep. 13, 2018

Related U.S. Application Data

(60) Provisional application No. 62/470,859, filed on Mar. 13, 2017.

(51) Int. Cl.
*G06K 9/00* (2006.01)
*G06T 7/00* (2017.01)

(52) U.S. Cl.
CPC ....... *G06K 9/0014* (2013.01); *G06K 9/00134* (2013.01); *G06T 7/0012* (2013.01);
(Continued)

(58) Field of Classification Search
None
See application file for complete search history.

(56) References Cited

U.S. PATENT DOCUMENTS 4,523,278 A   6/1985  Erhardt et al.
4,700,298 A  10/1987  Palcic et al.
(Continued)

FOREIGN PATENT DOCUMENTS

JP    2014006100 A    1/2014
WO      9114235 A1    9/1991

OTHER PUBLICATIONS

De Los Santos, et al., "FRAP, FLIM, and FRET: Detection and analysis of cellular dynamics on a molecular scale using fluorescence microscopy", Molecular Reproduction and Development, 82, 2015, 587-604.
(Continued)

*Primary Examiner* — Atiba O Fitzpatrick
(74) *Attorney, Agent, or Firm* — Brake Hughes Bellermann LLP

(57) ABSTRACT

Techniques for identifying a region of interest in an image of a biological cell include detecting a primary axis of a structure of the biological cell and defining a first section line along the detected primary axis, detecting at least one secondary axis of the structure of the biological cell and defining a second section line along each of the at least one secondary axes. Based on the second section line along each of the at least one secondary axes and the first section line along the detected primary axis, a cytoplasm of the cell is divided into a plurality of areas. A geometric feature of each of the areas is determined and one of the areas is selected according to predefined criteria. The image data of the selected area is analyzed, and the image data is compared with the predefined criteria to identify regions that comply with the provided criteria. At least one area complying with the predefined criteria to a pre-defined degree is selected as the region of interest.

20 Claims, 28 Drawing Sheets

(52) U.S. Cl.
CPC ............... *G06T 2207/20068* (2013.01); *G06T 2207/20104* (2013.01); *G06T 2207/30024* (2013.01)

(56) References Cited

U.S. PATENT DOCUMENTS

| | | | |
|---|---|---|---|
| 4,724,543 | A | 2/1988 | Klevecz et al. |
| 5,756,696 | A | 5/1998 | Gray et al. |
| 6,150,173 | A | 11/2000 | Schubert |
| 6,246,785 | B1 | 6/2001 | Molnar et al. |
| 6,418,236 | B1 | 7/2002 | Ellis et al. |
| 2005/0266395 | A1* | 12/2005 | Gholap .............. G01N 33/5091 435/4 |
| 2009/0310833 | A1* | 12/2009 | Ascenzi ............... G06K 9/0014 382/128 |

OTHER PUBLICATIONS

Yapp, et al., "Frapid: achieving full automation of FRAP for chemical probe validation", Optics Express, 24, 2016, 122-441.

European Search Report for Application 18161342.3, dated Dec. 12, 2018, 16 pages.

Latorre, A., et al., "Segmentation of Neuronal Nuclei Based on Clump Splitting and a Two-Step Binarization of Images"; Expert Systems with Applications 40, No. 16, Nov. 15, 2013; pp. 3521-6530.

Piper, et al., "Computer Images Analysis of Comparatve Genomic Hybridization", Cytometry, Alan Liss, New York, US, vol. 19, No. 1, Jan. 1, 1995; pp. 10-26.

\* cited by examiner

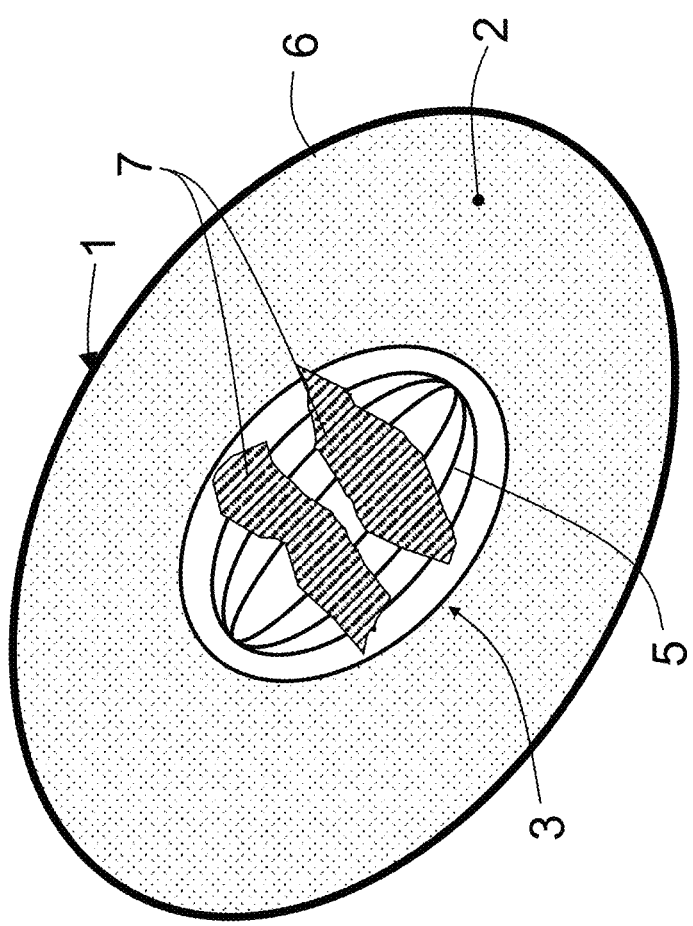

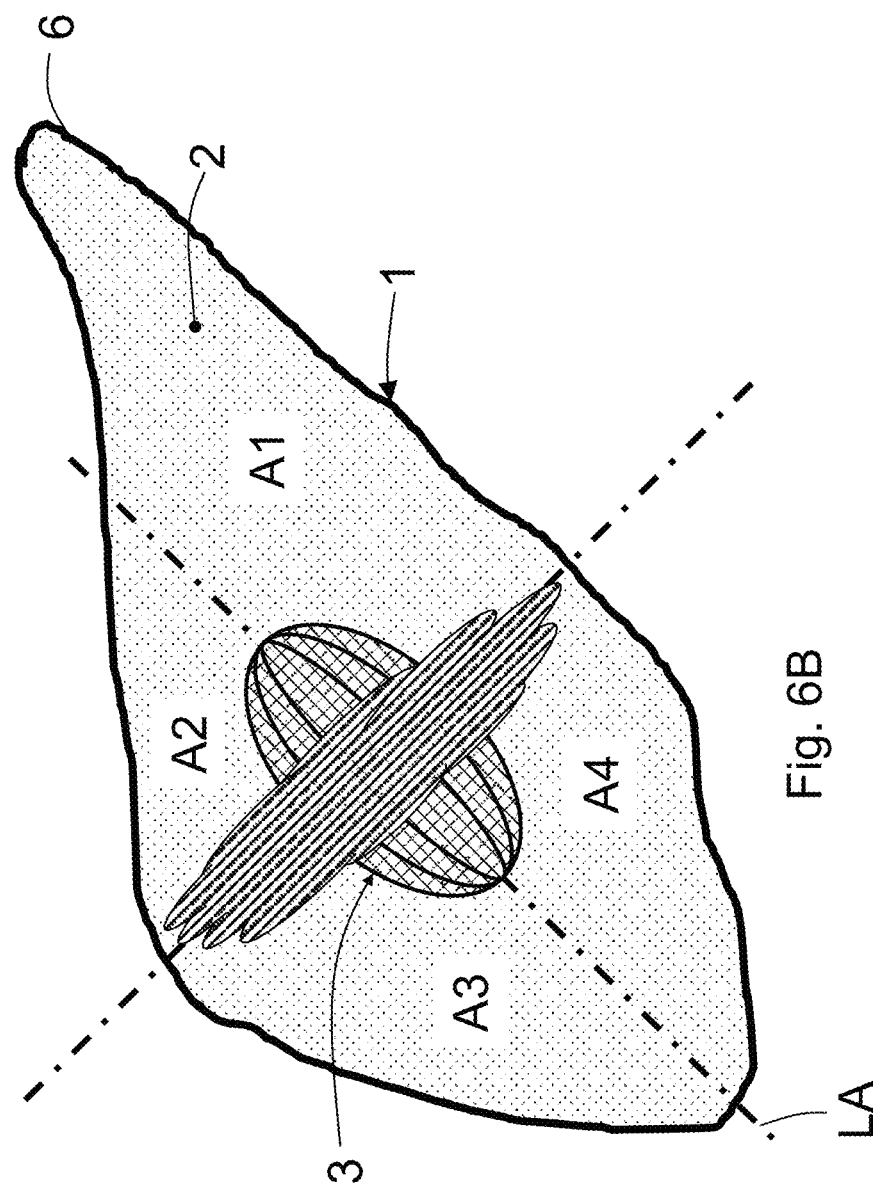
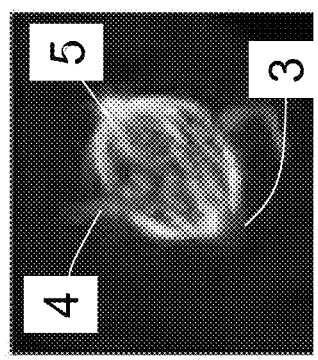
Fig. 6A
Fig. 6B

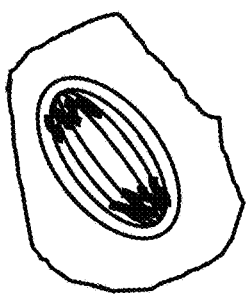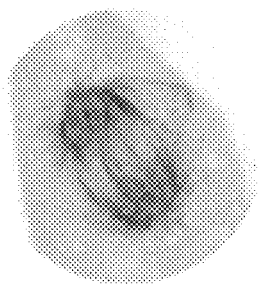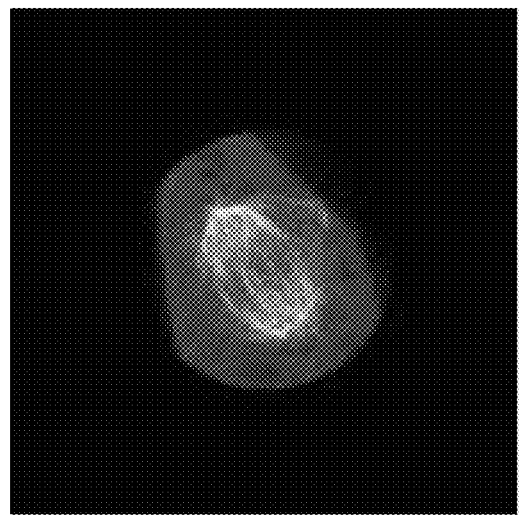
Fig. 14

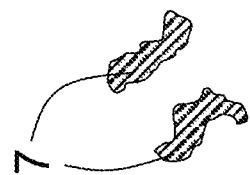
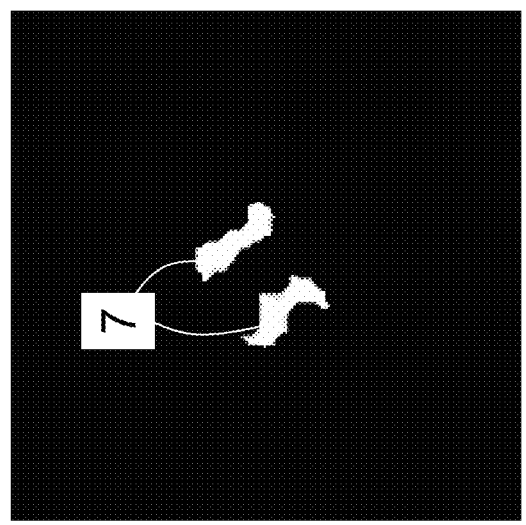
Fig. 15

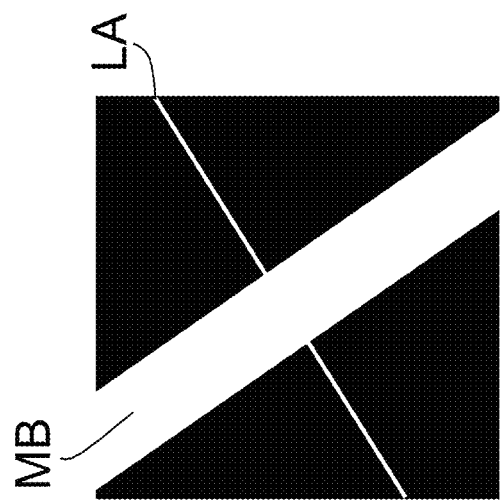

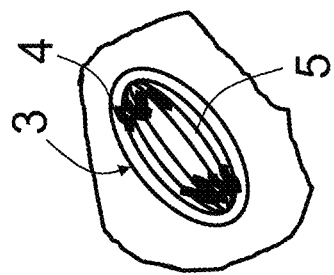
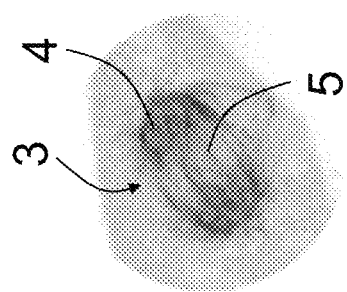
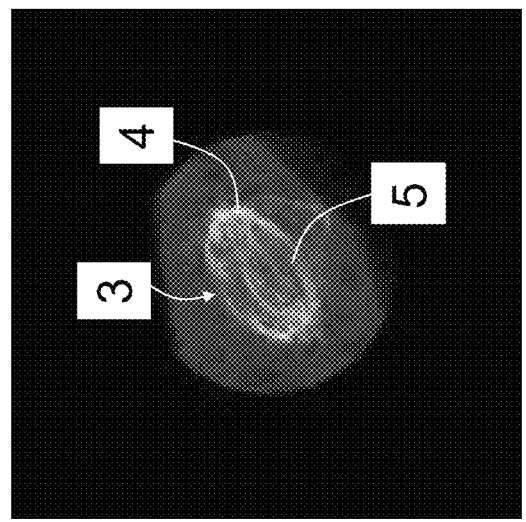
Fig. 20

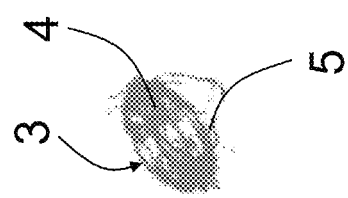
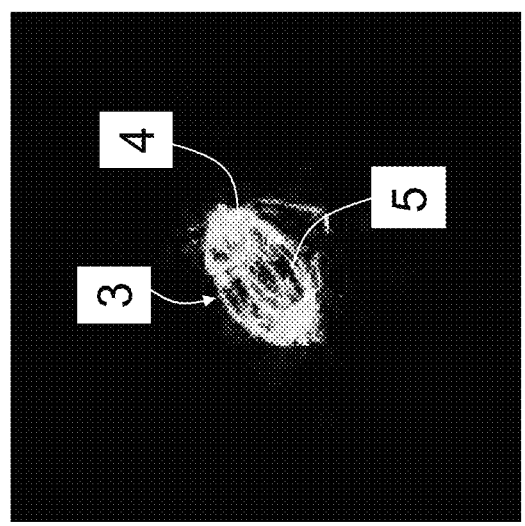
Fig. 21

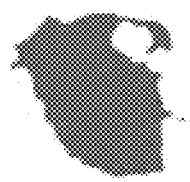
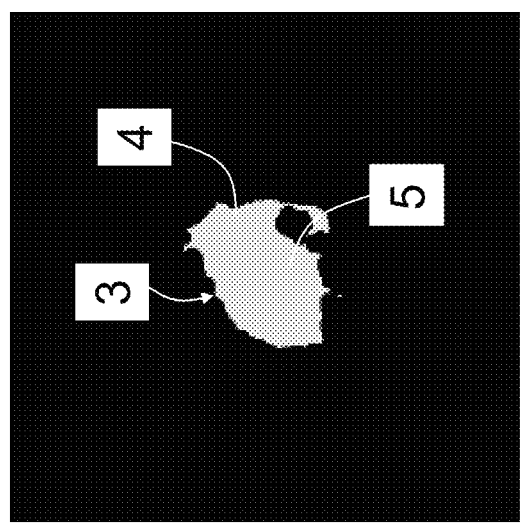
Fig. 22

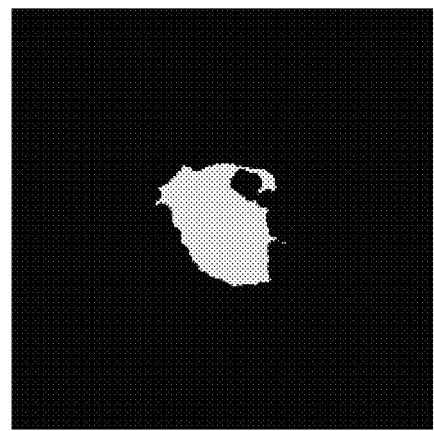
Fig. 23

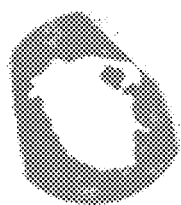 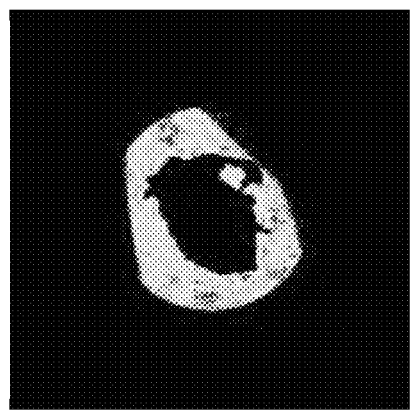
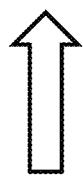 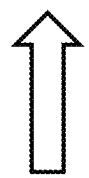
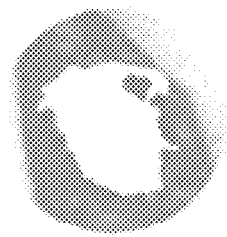 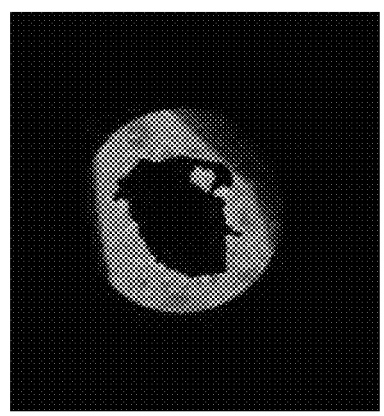
Fig. 25

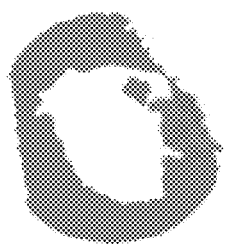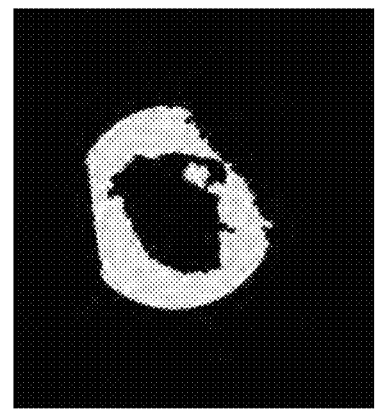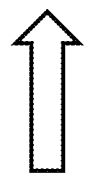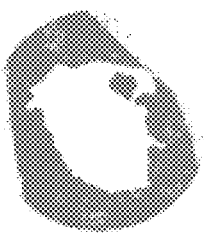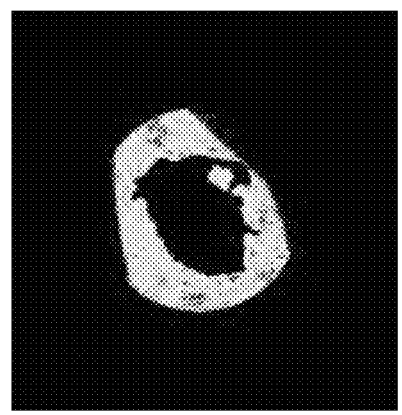
Fig. 26

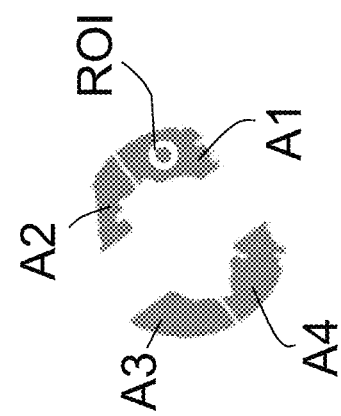
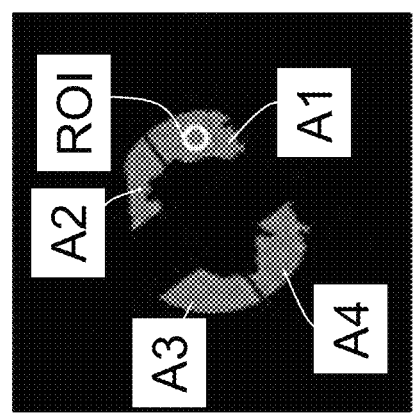
Fig. 28

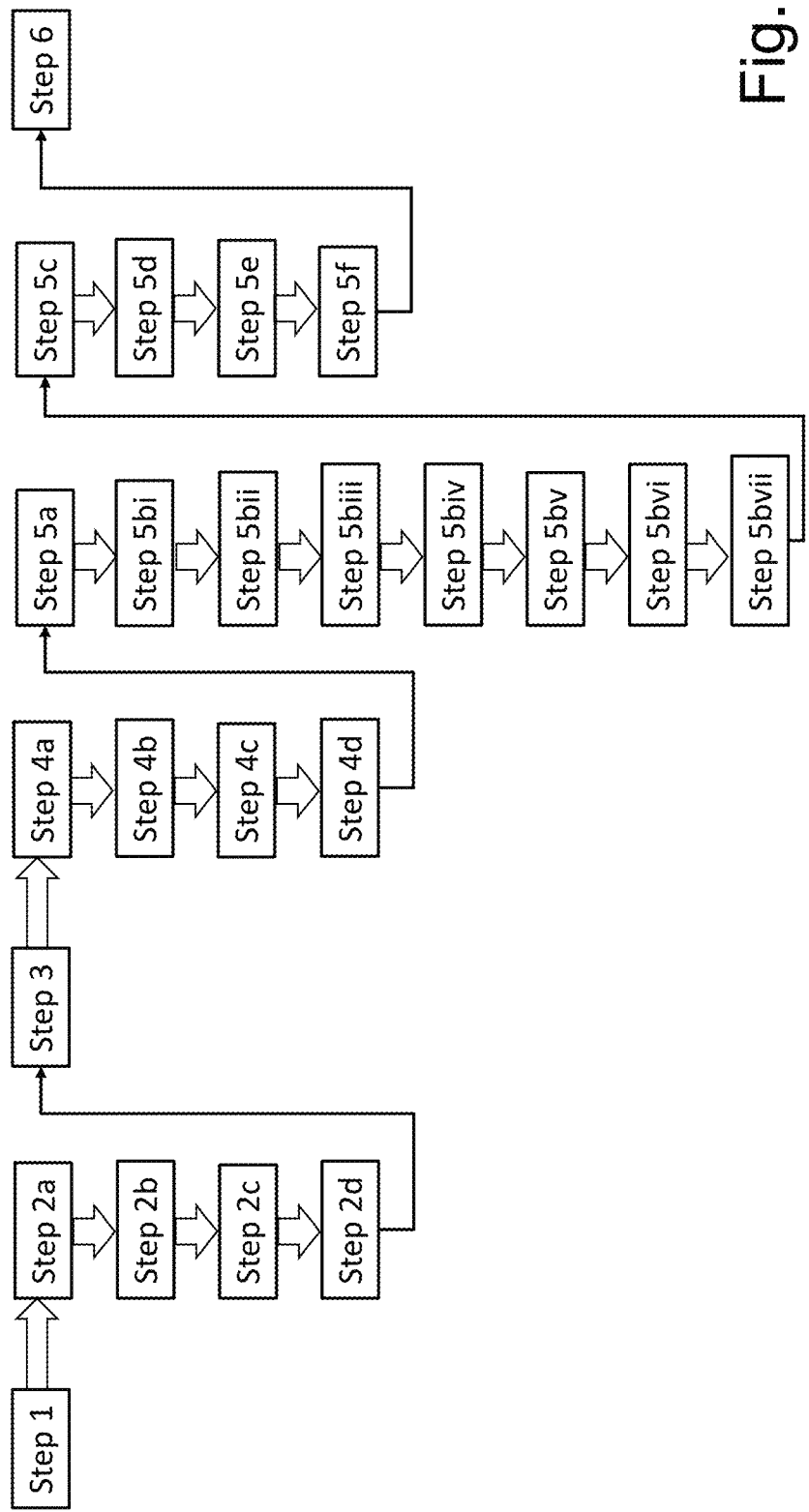

AUTOMATICALLY IDENTIFYING REGIONS OF INTEREST ON IMAGES OF BIOLOGICAL CELLS

CROSS-REFERENCE TO RELATED APPLICATION

The application is a non-provisional of, and claims priority to, U.S. Provisional Patent Application Ser. No. 62/470,859, entitled "Automatically Identifying Regions of Interest on Images of Biological Cells," and filed on Mar. 13, 2017, the disclosure of which is incorporated herein by reference in its entirety.

TECHNICAL FIELD

This disclosure relates to selection of certain regions within an image, particularly on the selection of regions of interest within an image taken using a microscope.

BACKGROUND

In modern microscope applications, imaging of biological samples can be combined with experiments, for example, on diffusion rates within the cytoplasm of biological cells, as described, for example, in C. de los Santos et al., 2015, *Molecular Reproduction and Development,* 82: 587-604, which is incorporated herein by reference in its entirety.

One experimental approach is FRAP (fluorescence recovery after photobleaching). Within an experimental area of the cell, especially within the cytoplasm, fluorescent labelled molecules are bleached by directing a high-intensity radiation beam to that sample area (hereinafter called region of interest). Observing the bleached region of interest for a period of time permits assessing the recovery of fluorescence in the region of interest (ROI) due to labelled molecules moving in to the ROI from the surrounding cytoplasm. The dynamics of the recovery of fluorescence enables conclusions on diffusion rates of labeled molecules in the cytoplasm. For conducting FRAP experiments and for obtaining meaningful and reliable experimental data, a useful region of interest should be identified and selected. Generally, ROI's are determined manually through human supervision, but this is time consuming and inefficient.

Other experimental approaches for studying cells include FLIP (Fluorescence Loss in Photobleaching), AB-FRET (Acceptor bleaching-Fluorescence Resonance Energy Transfer), experiments in which cell organelles/cell structures are destroyed or altered within a pre-defined region of interest of the cell.

SUMMARY

In a first general aspect, a method for identifying a region of interest in an image of a biological cell includes detecting a primary axis of a structure of the biological cell and defining a first section line along the detected primary axis, detecting at least one secondary axis of the structure of the biological cell and defining a second section line along each of the at least one secondary axes. Based on the second section line along each of the at least one secondary axes and the first section line along the detected primary axis, a cytoplasm of the cell is divided into a plurality of areas. A geometric feature of each of the areas is determined and one of the areas is selected according to predefined criteria. The image data of the selected area is analyzed, and the image data is compared with the predefined criteria to identify regions that comply with the provided criteria. At least one area complying with the predefined criteria to a pre-defined degree is selected as the region of interest.

Implementations can include one or more of the following features, alone, or in any combination with each other. For example, the primary axis can be a long axis of the structure of the cell and the secondary axis can be a short axis of the structure of the cell. The geometric feature of each of the areas can be a size (e.g., a diameter, a width, length, or other liner dimension, an area, a volume, etc.) or a shape of the feature, and the feature can include the entire area or a portion of the area. The structure of the cell can include a nucleus of the cell. The structure of the cell can include an outer membrane of the cell.

Detecting the at least one secondary axis can include identifying and measuring the structure of the cell, and defining the at least one secondary axis along the smallest extension of the structure of the cell. The method can additionally include detecting two secondary axes, where the detecting includes identifying centers of regions created by merging image data of chromosomes/chromatids of a nucleus of the cell, and defining a quadrilateral extending between at least two secondary axes as a masking bar.

Detecting the primary axis can include extending an axis perpendicular to the at least one secondary axis until both ends of the axis cross an outer membrane of the cell, and selecting the axis with the greatest length as the primary axis. Detecting the primary axis can include fitting a line through centers of detected sub regions of a nucleus of the biological cell.

The selected region of interest can be marked in an image of the biological cell. The plurality of areas can include at least four areas. A FRAP-experiment can be performed on the biological cell in the selected region of interest.

In another aspect, a microscope system can include a detection unit configured for detecting images of biological cells and an analysis unit. The analysis unit can be configured for detecting a primary axis in a structure of the biological cell, defining a first section line along the detected primary axis, detecting at least one secondary axis of the structure of the biological cell, defining a second section line along each of the at least one secondary axes, dividing a cytoplasm of the cell into a plurality of areas based on the second section lines along each of the at least one secondary axes and the first section line along the detected primary axis, determining a geometric feature for each of the areas, selecting one of the areas according to predefined criteria, analyzing image data of the selected area and comparing image data with the predefined criteria to identify at least one region that complies with the predefined criteria, and selecting the at least one region complying with the provided criteria to a pre-defined degree as the region of interest.

Implementations can include one or more of the following features, alone, or in any combination with each other. For example, the structure of the cell can include a nucleus of the cell. The structure of the cell can include an outer membrane of the cell.

Detecting the at least one secondary axis can include identifying and measuring the structure of the cell and defining the at least one secondary axis along the smallest extension of the structure of the cell. Detecting the at least one secondary axis can include detecting two secondary axes by identifying centers of regions created by merging image data of chromosomes/chromatids of a nucleus of the cell, and defining a quadrilateral extending between at the two secondary axes as a masking bar. Detecting the primary axis can include extending an axis perpendicular to the at least one short axis until both ends of the axis cross an outer membrane of the cell, and selecting the axis with the greatest length as the long axis. Detecting the primary axis can include fitting a line through centers of detected sub regions of a nucleus of the biological cell.

The analysis unit can be further configured for marking the selected region of interest in an image of the biological cell. The plurality of areas can include at least four areas.

The details of one or more implementations are set forth in the accompanying drawings and the description below. Other features will be apparent from the description and drawings, and from the claims.

BRIEF DESCRIPTION OF THE DRAWINGS

FIG. 2 is a schematic drawing of a biological cell during mitosis, with a detected image mask of chromatids merged.

FIG. 6A is an image of a cell during mitosis.

FIG. 6B is a schematic diagram of the cell during mitosis with determined short and long axis of the cell shown by lines and a detected image mask of chromatids merged.

FIG. 14 shows an original image of a cell, a black-white-image of the cell, and a schematic drawing of the cell after subtracting the image mask of FIG. 13 from the original image.

FIG. 15 shows schematic drawings of chromatids/chromosomes extracted from an image (e.g., as shown in FIG. 14) with the chromatids/chromosomes shown in context and in isolation.

FIG. 19 is a schematic drawing of a mask created by filling the area enclosed by short axes and connecting lines.

FIG. 20 shows an original image of a cell provided by a selected green channel, a black-white-image of the cell provided by a selected green channel, and a schematic drawing of the cell provided by a selected green channel.

FIG. 21 is a schematic drawing showing a raw image and an inverted black-white-image of a cell to illustrate a first step of a 2-level Otsu automatic thresholding.

FIG. 22 is a schematic drawing schematic drawing showing a raw image and an inverted black-white-image of a cell illustrating a second and a third step of a 2-level Otsu automatic thresholding that includes removing imaged small particles from the image and filling enclosed but empty areas of the image and smooth edges of the imaged object.

FIG. 23 is a schematic drawing showing a raw image and an inverted black-white-image of a cell illustrating a fourth step of a 2-level Otsu automatic thresholding that includes dilating the imaged object slightly and creating a mask.

FIG. 25 is a schematic drawing illustrating a sixth step of a 2-level Otsu automatic thresholding and showing a thresholding of the "subtraction image."

FIG. 26 is a schematic drawing illustrating a seventh step of a 2-level Otsu automatic thresholding and showing filling enclosed but empty areas of the "subtraction image" and smooth edges of the imaged object.

FIG. 28 is a schematic drawing of cytoplasm quadrant image (in raw and inverted images) having a region of interest marked by a circle placed in the largest quadrant.

FIG. 31 is a flow chart of the method for identifying regions of interest on images of biological cells.

DETAILED DESCRIPTION

Figure 1A:
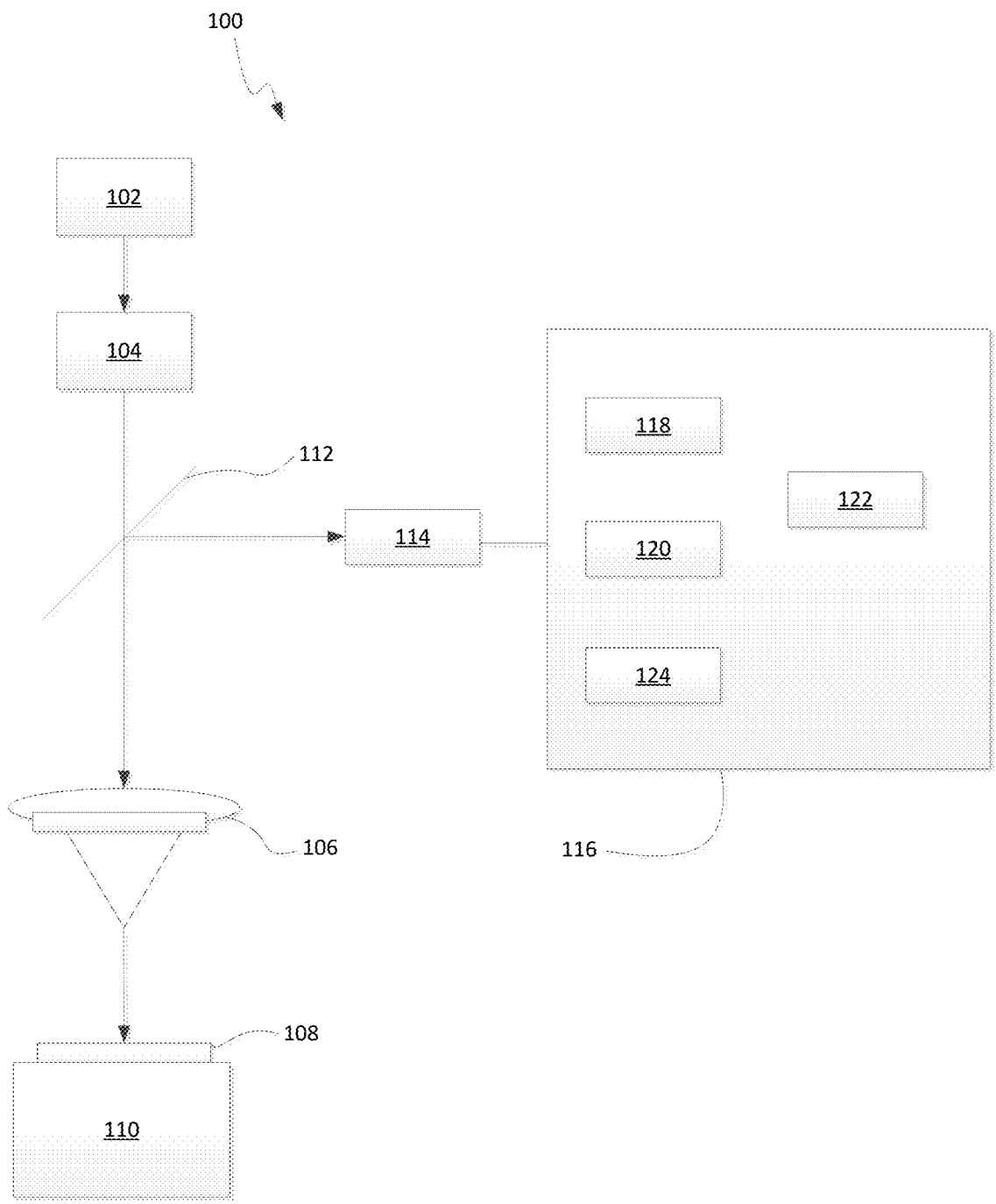
FIG. 1A is a schematic diagram of a system for automatically determining regions of interest in an image of a specimen (e.g., a cell) based on structures in the image.

Techniques and apparatuses (e.g., microscopes) are described herein for automatically (i.e., without human input or intervention after an image is obtained) identifying regions of interest on images taken from biological tissue and cells, thus permitting the automation of experiments to allow for data sampling while greatly reducing the need for human supervision. Such techniques are suitable, for example, for application on axial cells.

In one embodiment, regions of interest on images of biological cells can be identified by:

taking an image of the cell and providing it to an analysis unit, defining at least one secondary axis of the nucleus or detecting at least one secondary axis of the cell and defining at least one section line along the secondary axis, detecting a primary axis of the cell and defining another section line along the detected primary axis, thus dividing the cell including its cytoplasm into areas, determining a geometric feature each of the areas, selecting one of the areas according to predetermined criteria, analyzing image data of the selected area and compare image data with provided criteria in order to identify at least one regions of interest (ROI) which complies with the criteria (at least to a pre-defined degree/percentage), choosing at least one region of interest complying with the criteria to a pre-defined degree, marking the selected at least one region of interest.

Depending on the length chosen for the primary axis, the imaged portion of the cell can be subdivided into a number of different, for example, three, four, five, six, seven, eight, or more.

In some embodiments, section lines can be defined, where the section lines are directed under a certain angle from the secondary or primary axis. This can help to avoid areas in close proximity to optionally designated regions of the cell (e.g., the nucleus, membranes or cell organelles), which can be excluded from being selected.

In some embodiments, regions of the cell situated close to structures, such as, for example, the nucleus, membranes, organelles, etc. can be selected and used for selecting and placing a region of interest.

In other embodiments, the primary axis can be determined, followed by detection of the secondary axes. Secondary axes can be, for example, secondary axes of the cell, the nucleus or other structures.

Defining axes (e.g., the secondary axis and/or the primary axis, respectively axes) can be done by gathering data on the shape, and optionally on the spatial orientations, of the respective cell. If the cells show a distinctive elongated shape, the direction of the elongation may be used to define the primary axis. In order to determine an elongated shape, the number of picture elements (pixels) in the elongated direction can be compared to the number of picture elements in the other direction.

Detection of the primary and/or secondary axis may be performed using detected cell components, such as, for example, the spindle apparatus, oriented chromosomes, and/or chromatids. The angles or orientation of the axes may be determined from the measured dimensions of the cell boundary or some other subcellular structure. In some embodiments, the placement and lengths of the axes can be determined by starting at the measured center of the cell or one of its identified subcellular components (such as the nucleus), extending a ray out from the center in both directions along each axis direction or orientation until the cell boundary is reached. The cell boundary may be determined to be the point where the image pixel intensity becomes either sufficiently low or sufficiently high in the original image, in a processed image derived from the original image, or in a mask image derived from the original or processed image. Alternatively, the rays may extend from the center to a predetermined distance.

Parameters useful for the method can include, for example:

the distance/angle of axis lines;

the median length of axis lines, sum of length of axis lines; and the distance to crossing of the axis lines with the cell (for example with membrane) or structure circumferential line.

As used herein, the term "region" refers to a section or part for example of an image of an object (e.g., a cell), and the term "region of interest" is used more specifically to refer to a site that has been determined to fulfill predefined criteria. Such a site may be marked and selected, for example, as an experimental site.

Regions of a cell image containing distinct and densely packed structures such as chromatids may be virtually merged. For example, the image data (pixels) representing chromatids can be merged to larger areas by data processing (see FIG. 4: enclosed areas filled with striped lines).

Structures of a cell may be marked and visualized using different (e.g., molecular) markers or labels that emit or reflect radiation at different wavelengths. Useful markers can include fluorescent marker molecules, for example.

Structures may be determined manually by a user or by applying an algorithm. Such an algorithm can be based on the temporal and/or spatial distribution of intensity values. Intensity values and/or ratios of those intensity values can be analyzed for particular wavelengths or for all wavelengths.

In some embodiments, a length of circumferences of a cell, of an area and/or a selected organelle or region (for example, the nucleus) of the cell can be computed alternatively or additionally. Furthermore, a cell shape and/or cell size (area, volume) can be measured or computed, respectively. These computed parameters can be used in some implementations to determine properties of the imaged objects (e.g., the cell or components of the cell).

Furthermore, ratios of measured and/or computed parameters, such as, for example, a circumferential length, a diameter, a length of an axis, etc. can be computed and used for computing or estimating cell size and/or cell shape.

The term "estimating" is understood herein as computing while considering measurement errors and/or considering intrinsic/extrinsic deviances.

The techniques described herein are suitable for application on biological samples, e.g., on axial cells. For example, the techniques can include identifying regions of interest on images of biological cells by:

taking an image of the cell and provide it to an analysis unit, detecting at least one secondary axis of the nucleus or detecting at least one secondary axis of the cell and defining at least one section line along the secondary axis, detecting the primary axis of the cell and define another section line along the detected primary axis, thus dividing the cell including its cytoplasm into areas, determining a geometric feature for each of the areas, selecting one of the areas according to predetermined criteria, analyzing image data of the selected area and compare image data with provided criteria in order to identify regions of interest, which comply with the criteria (at least to a pre-defined degree/percentage), choosing at least one region of interest complying with the criteria to a pre-defined degree, marking the selected at least one region of interest.

In addition, the techniques decried herein can be used for identifying regions of interest on images from biological cells, by:

taking an image of the cell and provide it to an analysis unit, detecting at least one secondary axis of the nucleus or detecting at least one secondary axis of the cell and defining at least one section line along the secondary axis, detecting the primary axis of the cell and defining another section line along the detected primary axis, thus dividing the cell including its cytoplasm into four areas, determining a geometric feature for each of the areas, selecting one of the areas according to provided criteria, where the criteria can be provided by a user or automatically, e.g., as the output of a machine learning algorithm trained to recognize certain objects in an image, analyzing image data of the selected area and compare image data with provided criteria in order to identify regions, which comply with the criteria (at least to a pre-defined degree/percentage), choosing at least one area complying with the criteria to a pre-defined degree, marking the selected at least one region.

The techniques described herein can be applied to dividing cells, for example, when observing cells during mitosis. The techniques described herein also are applicable on non-dividing cells. In the latter case, some modifications can be made, as explained below.

In further embodiments, it is possible to detect cell states, such as, phases of mitosis of a cell. For example, relative position of cell features like intensity peaks, detected structures and/or organelles can be used for detection of metaphase or anaphase during mitosis.

In further embodiments, it is possible to determine cell types and/or to classify imaged cells. Determined cell shapes may be used for identifying proliferation stages or cell cycle stages.

Both the marker identifying the cell in combination with the analysis of shape may help to conduct the analysis of cells/structures with an increased precision and reliability. The techniques may include, for example, by one or more of the following features:

detecting the at least one secondary axis is done by analyzing the image, identifying and measuring the nucleus and defining the at least one secondary axis along the smallest extension of the nucleus, detecting two secondary axes of the nucleus by identifying centers of sub regions of the nucleus, while secondary axes intersect centers of sub-regions; optionally defining a strip or bar extending between the at least two secondary axes as a masking region, detecting the primary axis is done by extending the primary axis perpendicular to the at least one secondary axis until both ends of the primary axis cross the outer membrane of the cell and select the axis with the greatest length, detecting the primary axis is done by fitting a line through the centers of the sub regions.

In addition, disclosed herein is a microscope including a detection unit for detecting (e.g., fluorescently and/or non-fluorescently) labelled and non labelled structures of samples (preferably biological samples, biological cells, and tissues) and an analysis unit, where the analysis unit (such as a computer equipped with appropriate software or firmware) is configured for carrying out the methods and techniques described herein.

For example, the analysis unit can be configured for:

detecting at least one secondary axis of the nucleus or cell and defining at least one section line along the axis, detecting the primary axis of the cell and defining another section line along the detected primary axis, thus dividing the cell including its cytoplasm into areas, for example, two, three, four, five, six or more, determining a geometric feature for each of the areas, selecting one of the areas according to criteria provided by a user or a predetermined protocol, analyzing image data of the selected area and compare image data with provided criteria in order to identify regions of interest, which comply with the criteria (at least to a pre-defined degree/percentage), choosing at least one region of interest complying with the criteria to a pre-defined degree, and marking the selected at least one region of interest virtually.

In another embodiment, the analysis unit can be configured for:

detecting at least one secondary axis of the nucleus or cell and defining at least one section line along the axis, detecting the primary axis of the cell and defining another section line along the detected primary axis, thus dividing the cell including its cytoplasm into four areas, determining a geometric feature for each of the areas, selecting one of the areas according to criteria provided by a user or predetermined protocol, analyzing image data of the selected area and comparing image data with provided criteria in order to identify regions of interest, which comply with the criteria (at least to a pre-defined degree/percentage), choosing at least one region of interest complying with the criteria to a pre-defined degree, and marking the selected at least one region of interest virtually.

The identified and selected ROI may be subsequently used as an experimental site for conducting a FRAP-experiment. Accordingly, the criteria for identification and selection of regions of interest can be chosen with respect to the intended subsequent use.

Conditions for ROI-selection (criteria) can include, for example:

computing an intensity ratio of signals representing the (color) marker of a structure;

thresholding of one or more of the signals;

computing ratios of size of area versus size of ROI;

computing ratios of areas versus length of outline/circumference of structure/cell or length of sections of outline/circumference;

computing or measuring distances (proximity) to: a) primary and/or secondary axis line, or b)

axis line intersecting points;

distance to or between axis lines;

median (or other percentile) length of axis lines versus size of ROI;

distance to intersections of the lines with the cell or structure outline a brightness of the ROI exceeding a threshold value.

There are many advantages of the techniques described herein. For example, the techniques provide for additional gain of reproducible, and thus more reliable, data. The identification and selection of regions of interest can be done automatically, thus reducing or even eliminating individual bias during selection of ROI's. Especially ROI's determined and selected by different people are more comparable to one another due to the reduction or exclusion of individual preferences. Thus, the meaning of statistical analyses also can be considerably increased, because ROI's are selected based on clearly predefined rules and criteria.

FIG. 1A is a schematic diagram of an example system 100 for automatically determining regions of interest in an image of a specimen (e.g., a cell) based on structures in the image. The system 100 includes a light source (e.g., a laser) 102 for producing light beam that impinges on a sample 108. Beam control elements 104 (e.g., mirrors, lenses, etc.) can be configured for steering and imaging the light beam on the sample 108. The light beam can pass through a beam splitter 112 and can be imaged by an objective 106 onto the sample 108. The sample can be supported and translated by a stage 110. Light emitted from the sample 108 (e.g., in response to the light be that is imaged onto the sample in the case of fluorescence emission) can be collected by the objective 106, and reflected off the beam splitter 112 into a detector 114 that is configured for detecting light for creating an image of the sample 108. Although fluorescence detection in an "epi configuration" is described with respect to FIG. 1A, other configurations are also possible. For example, light transmitted through the sample can be detected and/or fluorescence light collected by a lens other than the objective 106 can be detected.

An image of the sample 108 can provided to a region of interest (ROI) detector 116 that is configured for automatically determining a region of interest in the image. The ROI detector 116 can include hardware and software components. For example, the ROI detector 116 can include memory 118 storing executable instructions and a processor 120 configured for executing the instructions. The ROI can include a cell structure analysis unit 122 configured for analyzing and detecting cell structures, and a region of interest controller 124 configured for determining a region of interest in the image based on the detected structures. Additional figures herein illustrate how the techniques described herein are used for automatically determining regions of interest in an image of a specimen (e.g., a cell) based on structures in the image.

Figure 1C:
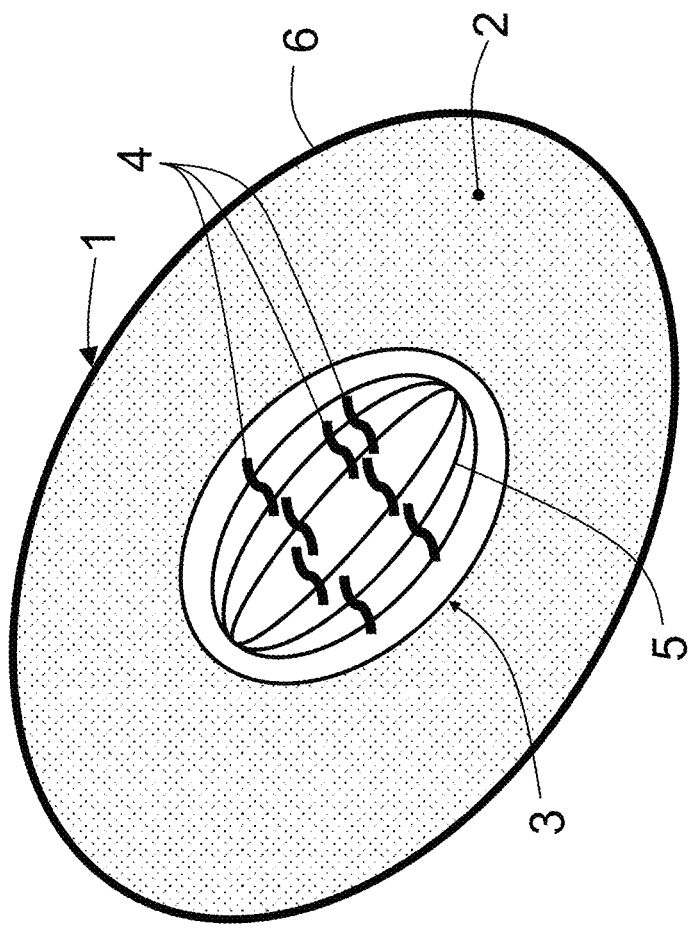
FIG. 1C is a schematic diagram showing the cell during mitosis (beginning anaphase).
Figure 1B:
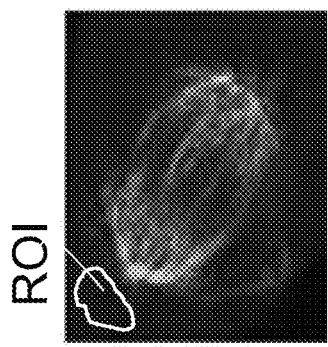
FIG. 1B is an image of a biological cell during mitosis (beginning anaphase).

For example, FIG. 1B is an image of a biological cell during mitosis (beginning anaphase), and FIG. 1C is a schematic diagram showing the cell 1 during mitosis (beginning anaphase). The image of FIG. 1B can be captured by the system 100, and the schematic diagram in FIG. 1C is illustrative of cellular structures. As shown in FIG. 1C, chromatids 4 are dragged towards the poles of the nucleus 3 by the spindle apparatus 5. The cytoplasm 2 surrounding the nucleus 3 is indicated by a point pattern. Cell membrane 6 is shown by a smooth outer line. Cell structures like the spindle apparatus 5, the chromosomes/chromatids 4 and (some) substances yield in the cytoplasm 3 can be marked by different fluorescent labels. The cell 1 can be excited by at least one appropriate excitation radiation corresponding to the marker used. Light emitted by the markers due to the received excitation radiation can be detected and displayed as an image of the cell 1.

Figure 3:
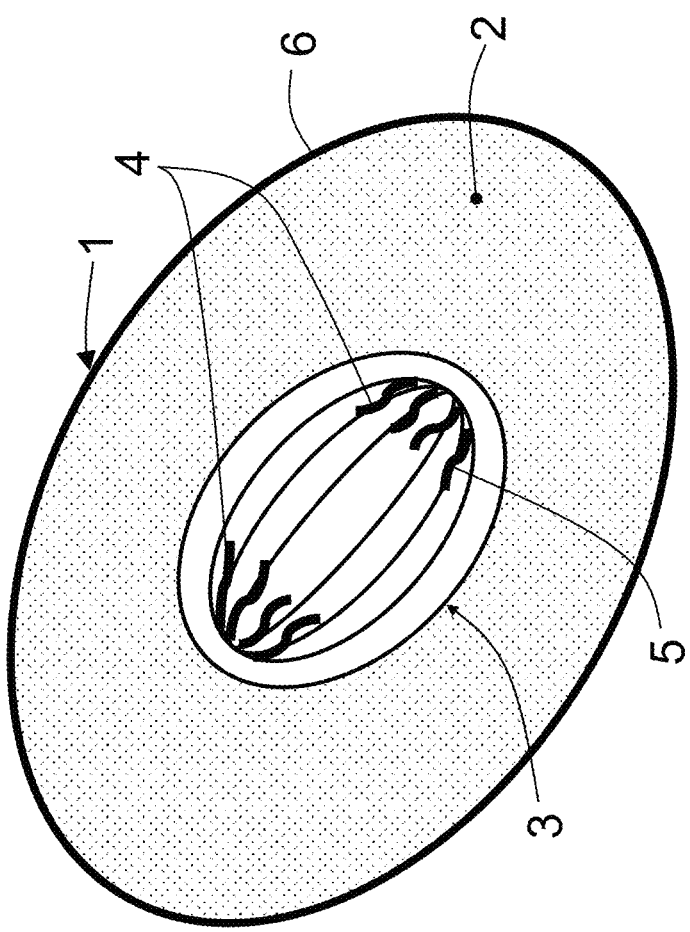
FIG. 3 is a schematic drawing of the biological cell during mitosis (end of anaphase).
Figure 4:
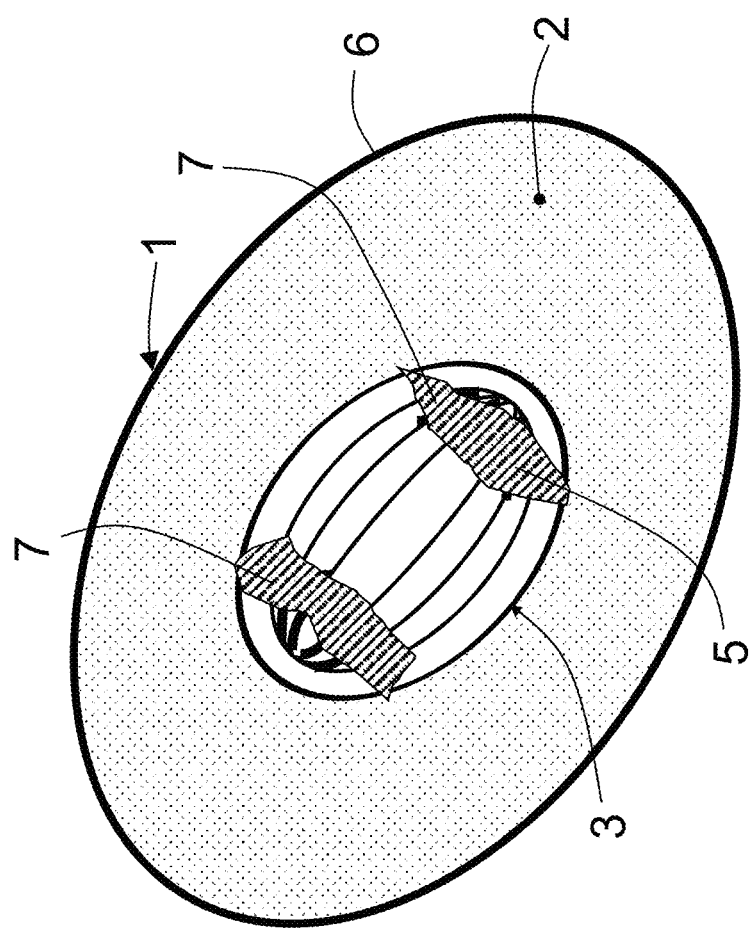
FIG. 4 is a schematic drawing of a biological cell during mitosis (end of anaphase), with a detected image mask of chromatids merged.

FIG. 2 is a schematic diagram of the cell 1 of FIG. 1, but the image data representing the chromosomes/chromatids 4 is merged to two irregular shaped sections 7 of the image. Each section 7 can approximate the shape and size of one group of chromatids 4 being dragged apart. FIG. 3 is a schematic diagram of the cell 1 of FIG. 1, but with the chromatids 4 being shown at the poles of the nucleus 3 (i.e., with the cell 1 being in anaphase). FIG. 4 is a schematic diagram of the cell 1 of FIG. 1, but with sections 7 of the image having been created by merging image data of chromatids 4 shown in FIG. 3.

Figure 5:
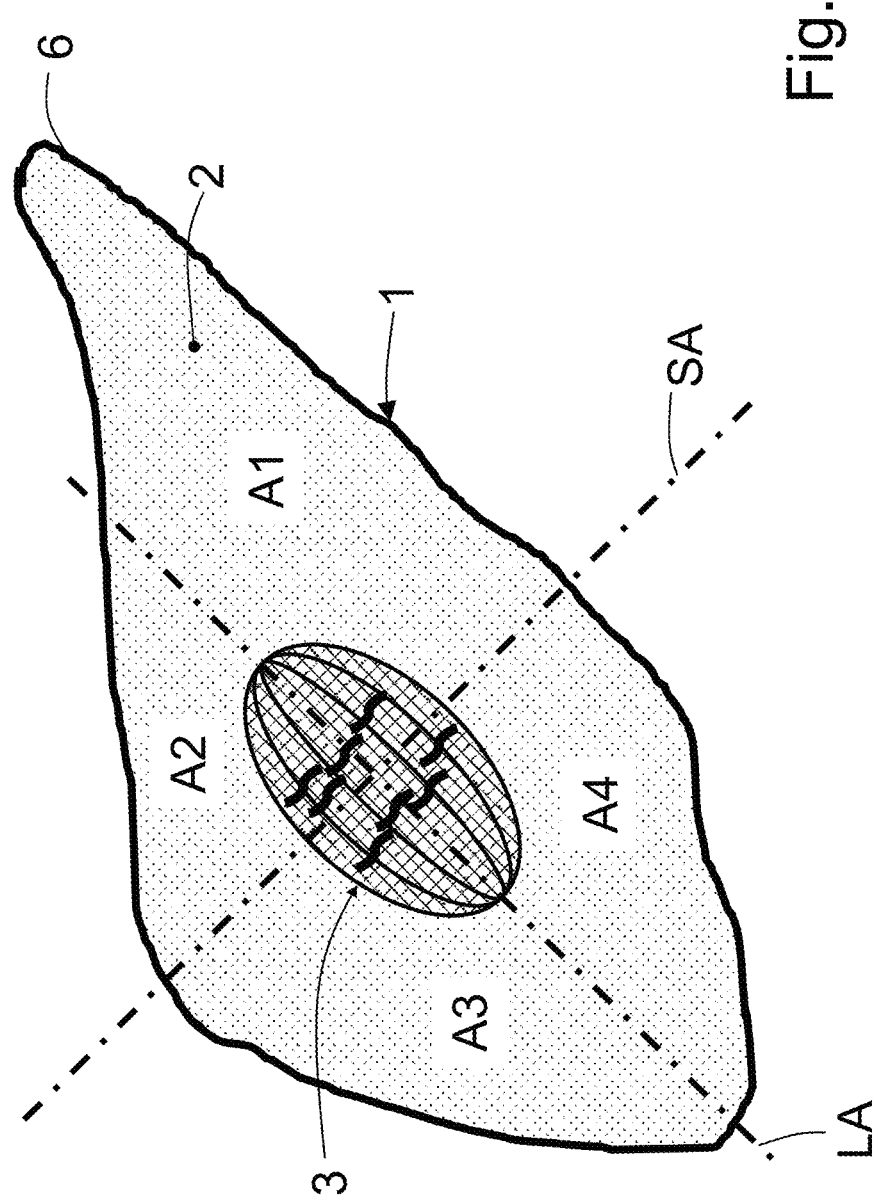
FIG. 5 is a schematic drawing of a biological cell during mitosis (anaphase), with determined short and long axes of the cell shown by lines.

FIG. 5 is another schematic diagram of a cell. A primary axis and a secondary axis of the nucleus can be determined (e.g., by pattern recognition techniques) in an image of a cell 1 shown in FIG. 5. In some implementations, the primary axis can be determined as the line through the centers of the two merged chromosome/chromatid regions. Alternatively, the primary axis can be determined as a line through any two detectable points within the cell or other object. In some implementations, the secondary axis can be perpendicular to the primary axis. In some implementations, the primary axis can correspond to a long axis (LA) or the cell, and the secondary axis can correspond to a short axis (SA). The nucleus 3 can have an elongated shape, and the long axis (LA) can run through the nucleus 3 in the direction of its elongation. The short axis (SA) can run perpendicular to the long axis (LA) and along an equatorial plane of the dividing cell 1. The cell 1 can be divided by the axes LA, SA into four areas A1, A2, A3 and A4.

FIGS. 6A and 6B are diagrams of cell of FIG. 5. FIG. 6A is an image of the cell, and FIG. 6B is a schematic diagram of the cell. Chromatids 4 (shown in the image of FIG. 6A) can emit a different wavelength or intensity of light than the spindle apparatus 5 and portions of the cytoplasm of the cell. Due to aberrations, the emitted light can be somewhat diffuse (e.g., as shown by the striped section across the nucleus 3).

Figure 7:
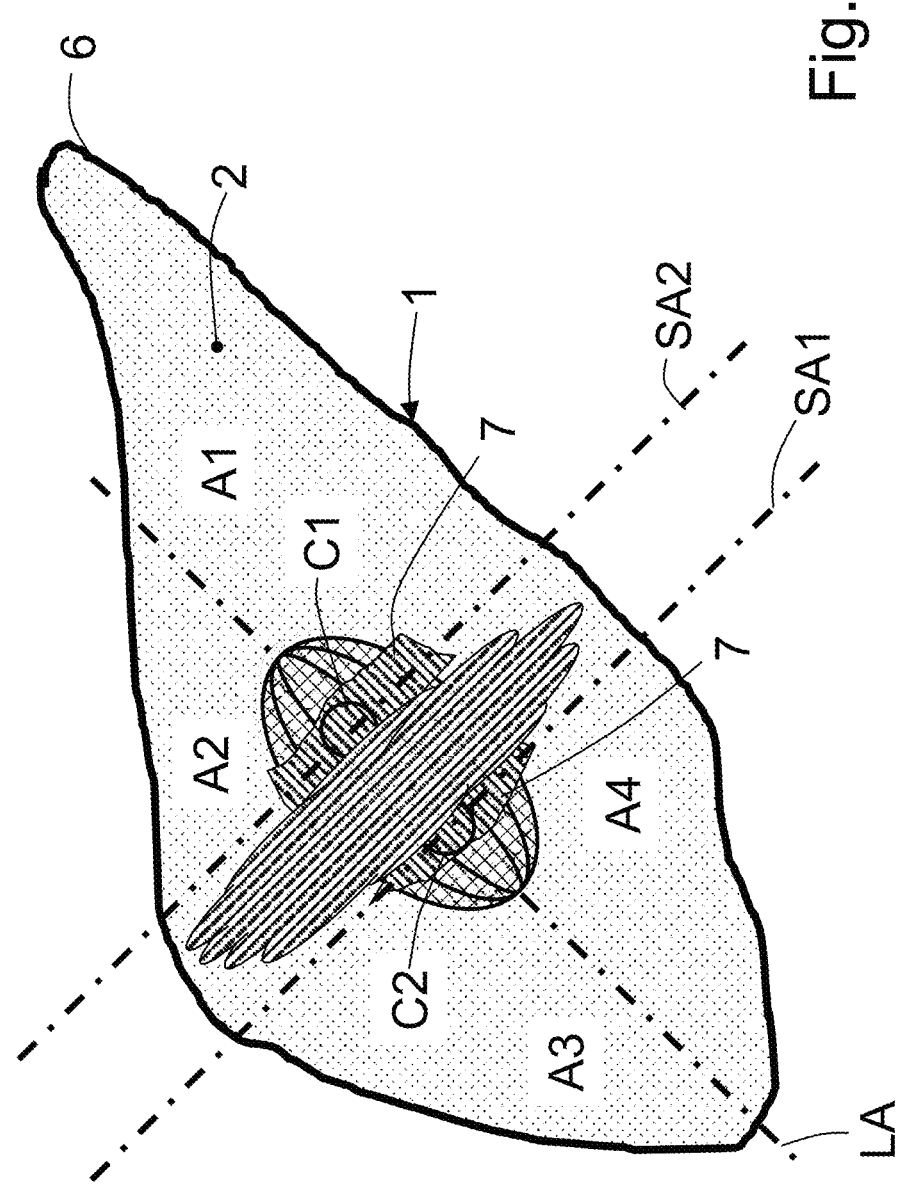
FIG. 7 is a schematic drawing of a biological cell during mitosis (anaphase), with two short and one long determined axes of the cell being shown by lines, and with a detected image mask of chromatids merged, where centers of merged areas are indicated by circles.
Figure 8:
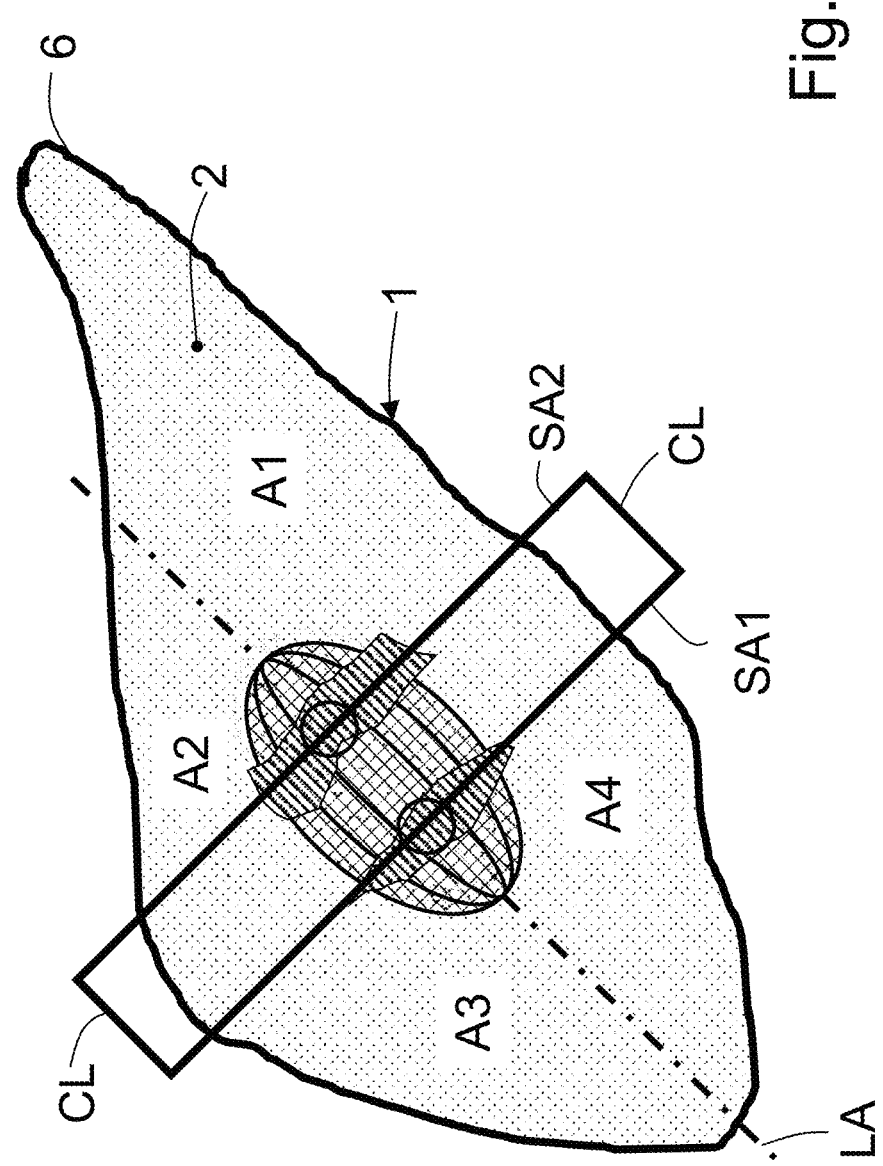
FIG. 8 is a schematic drawing of a biological cell during mitosis (anaphase), with two determined short axes given by a bar and one a long axis of the cell shown by a line, with a detected image mask of chromatids merged and centers of merged areas indicated by circles and a region of interest placed in the cytoplasm (circle).
Figure 9:
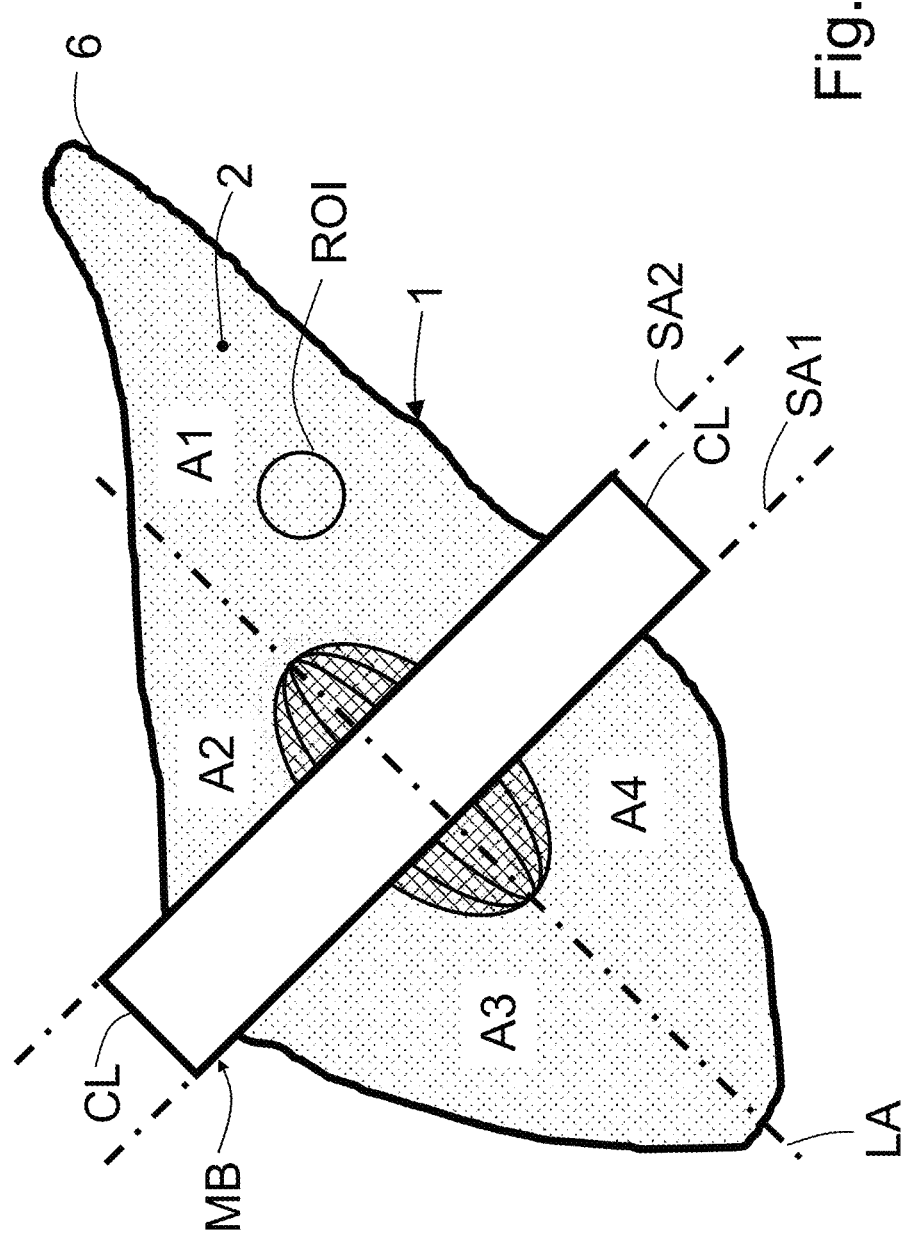
FIG. 9 is a schematic drawing of a biological cell during mitosis (anaphase), with two determined short axes given by a masked area and a long axis of the cell shown by a line, with a detected image mask of chromatids merged and centers of merged areas indicated by circles and a region of interest placed in the cytoplasm (circle) using a first methodological approach.

FIGS. 7, 8, and 9 are additional schematic diagrams of a cell. FIG. 7 shows automatically determined sections of the image, which were created by merging image data 7 of chromatids 4. Using a pattern recognition algorithm for computing centers of those sections, centers C1, C2 (indicated by circles) can be determined for each of the sections. The long axis (LA) of the nucleus can be fitted through the centers C1, C2. Two short axes of the nucleus (SA1, SA2) can be defined perpendicular to the long axis (LA). Each of the short axes (SA1, SA2) can run through one of the centers C1 or C2, respectively. In order to create a masking strip or a masking bar MB (see FIG. 9), the short axes SA1, SA2 can be virtually connected by connecting lines CL outside the extent of the imaged cell 1 to form a quadrilateral masking bar (see FIG. 8). The masking bar MB enclosed by the short axes SA1, SA2 and the connecting lines CL can be virtually filled, thus creating the masking bar MB, shown in FIG. 9. A region of interest (ROI) can be been selected marked by a circle placed in the cytoplasm 2 of the cell 1. In some implementations, the region of interest (ROI) can be placed at the center of the largest area A1 of the areas A1, A2, A3, and A4. In some implementations, the region of interest (ROI) can be placed at the center of an area other than the largest area.

Figure 10:
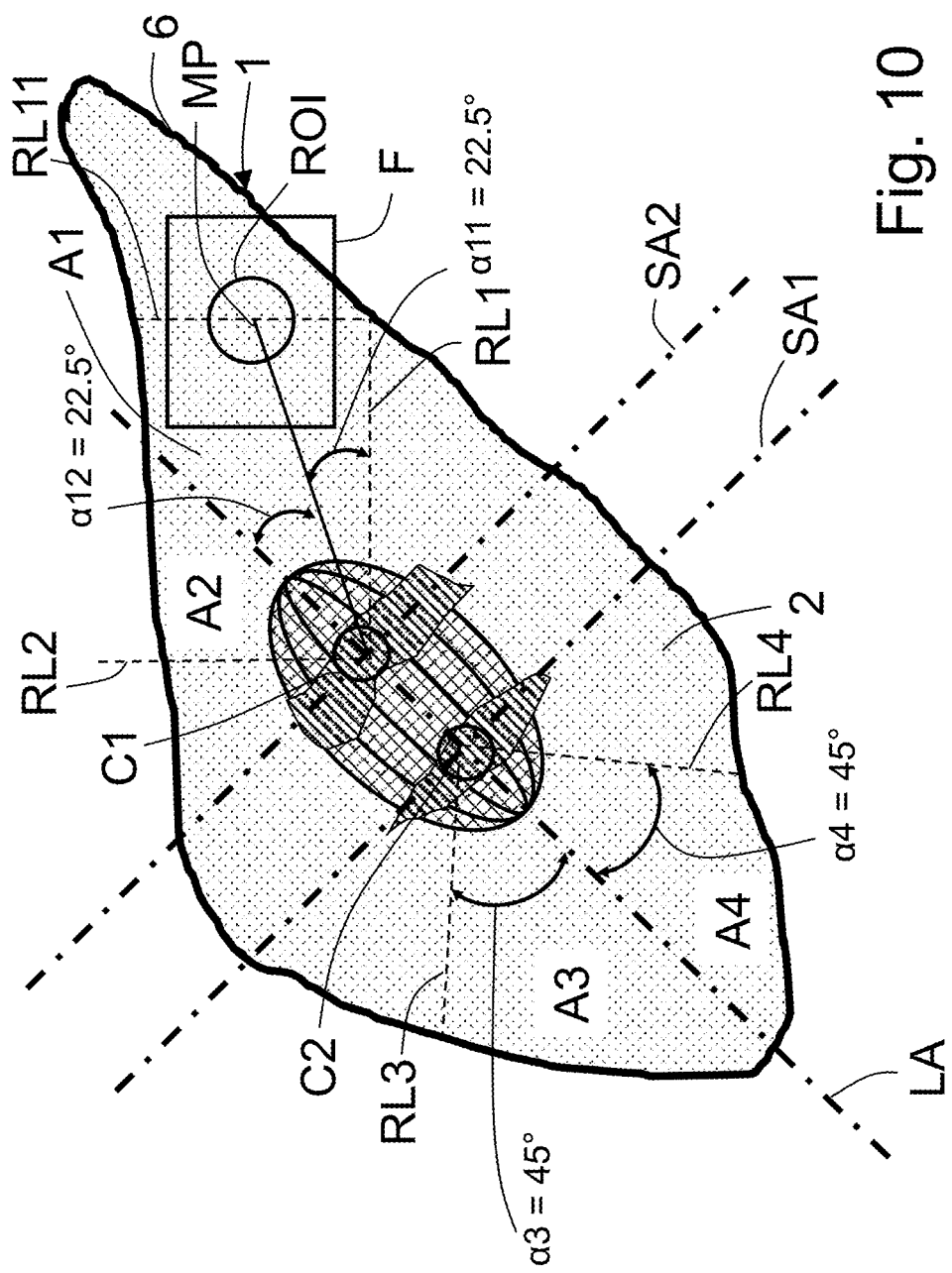
FIG. 10 is a schematic drawing of a biological cell during mitosis (anaphase), with determined a short axis and a long axis of the cell shown by lines, with a detected image of chromatids merged, centers of merged areas being indicated by circles and a region of interest placed in the cytoplasm (framed circle) using an alternative methodological approach.

FIG. 10 is another schematic diagram of a cell. Long axis (LA) and short axes (SA1, SA2) have been determined as explained above. From each center C1, C2 lines (RL1, RL2, RL3, RL4) can be drawn towards the membrane 6 of the cell 1. The lines (RL1, RL2, RL3, RL4) can define angles (first to fourth angle $\alpha 1$, $\alpha 2$, $\alpha 3$, $\alpha 4$) with respect to the long axis LA and can be designated as restriction lines RL1 to RL4. In some implementations, the angles can be about 45°. The restriction lines RL1 to RL4 restrict the areas A1, A2, A3 and A4, which are to be analyzed for placement of regions of interest ROI. In FIG. 10, the largest area, even restricted by the restriction line RL1, is area A1. From the point at which the restriction line RL1 intersects the cell membrane 6, another line RL11 can be defined running through area A1 perpendicular to restriction line RL1 from the intersection point of the restriction line RL1 with the cell membrane 6. Starting from the first center C1, an additional line can be drawn at an angle with respect to both the restriction line RL1 and the long axis LA. For example, the additional line can bisect the angle between RL1 and LA, such that it forms an angle of 22.5 degrees with respect to both the restriction line RL1 and the long axis LA. The point where the additional line intersects the vertical line RL11 can be set as the midpoint MP of the region of interest (ROI).

A region of interest (ROI) in an image of a cell can be determined and placed based on additional criteria as well. In one example, the location and/or size of the region of interest (ROI) may depend on the distance of the midpoint MP from the membrane 6 and/or another organelle in the cytoplasm 2. The region of interest (ROI) can be displayed within a quadrilateral (e.g., rectangular) frame F.

FIG. 31 is a flow chart of a method of automatically determining regions of interest in an image of a specimen (e.g., a cell) based on structures in the image and can include a plurality of steps, of which some are optional. For example, a microscope can been positioned manually or automatically so that the cell on which the ROI is to be placed is centered in the field of view (FOV) and so that the cell fills a significant portion of the FOV. Alternatively, traditional image segmentation techniques can be used to isolate the cell from the background in the image regardless of its magnification or position within the image.

As shown in FIG. 31, in a first step 1, the original image to have the region of interest (ROI) automatically placed can be selected, as shown, for example, in FIG. 5. In a second step 2, the center of the image can be optionally isolated. Prior centering can ensure that the cell 1 of interest is placed in the center of the field-of-view (FOV) of the microscope and can simplify and/or speed the subsequent processing. If multiple cells were to be processed in an image, then traditional segmentation could be employed.

Figure 13:
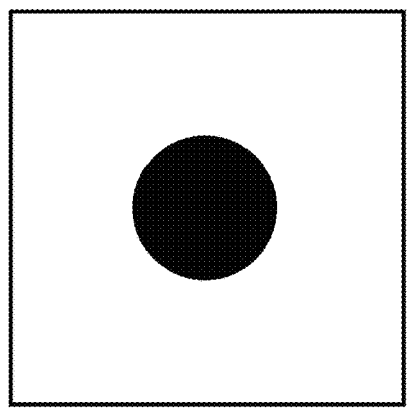
FIG. 13 is a schematic drawing of a finally created image mask.
Figure 12:
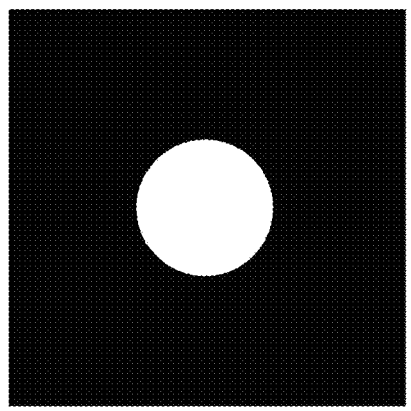
FIG. 12 is a schematic drawing of a second state of an image mask.
Figure 11:
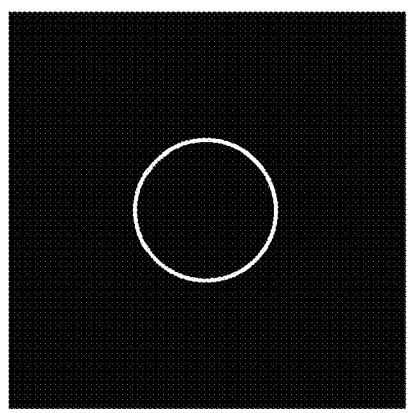
FIG. 11 is a schematic drawing of a first state of an image mask.

In an intermediate step 2a, a centered circle can be automatically drawn or determined on a blank image (see FIG. 11). The centered circle can be filled in an intermediate step 2b (see FIG. 12). The image can be inverted to create a "circular mask" in another intermediate step 2c (see FIG. 13). The circular mask can be subtracted from an original image in another intermediate step 2d (see FIG. 14), with the result of the subtraction being a cut-out of the original image. As shown in FIG. 14, the cut-out can be presented as an original image of a cell, a black-white-image of the cell, and a schematic drawing of the cell.

In another step 3, the chromosomes 4 can be isolated (e.g., through a pattern recognition algorithm), and the center coordinates of the sections 7 representing the merged image data of the chromosomes/chromatids can be obtained (see FIG. 15). In non-dividing cells, this can be done for the entire nucleus 3.

Figure 16:
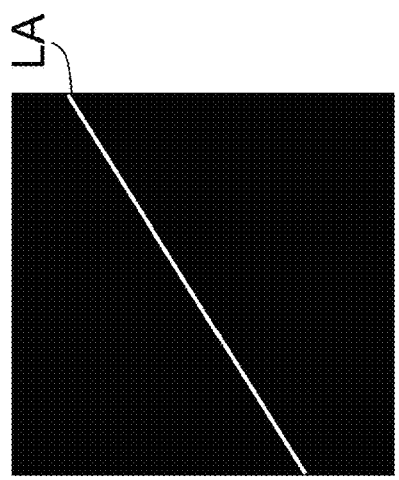
FIG. 16 is a schematic drawing of a constructed long axis of the cell.

A cytoplasm quadrant mask image can be created in a main step 4. In a blank image, a thin line can be drawn (see FIG. 16) through the chromosome region centers C1, C2 and extending to the edge of the image. If multiple cells were to be processed in an image, then this line could extend only to the outer extent of the cytoplasm 2 for each cell. For non-dividing cells, this could be a line through the center of the nucleus along the long axis LA of the nucleus 3 or the cell 1.

Figure 18:
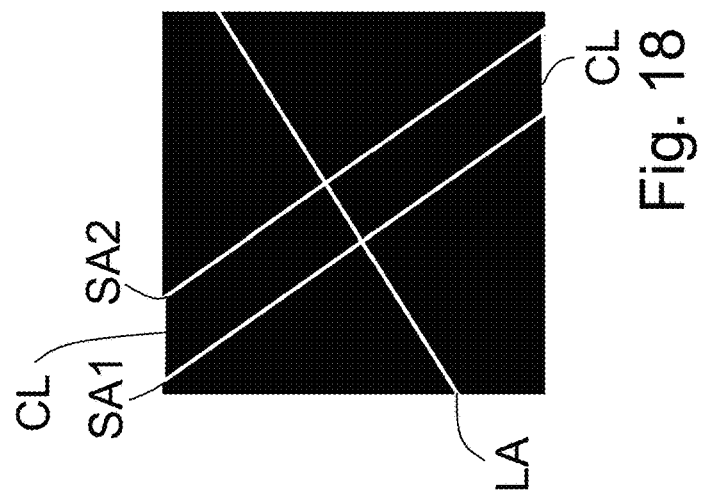
FIG. 18 is a schematic drawing of the long axis and the two short axes, whereas ends of short axes are connected by virtual connecting lines.
Figure 17:
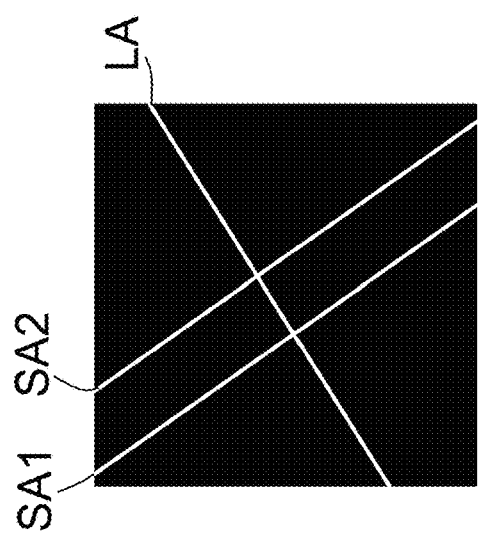
FIG. 17 is a schematic drawing of two short axes running perpendicular to the long axis.

In an intermediate step 4a, a line perpendicular to the line joining the two chromosome region center points C1, C2 can be drawn at each chromosome region center point C1 and C2, respectively (see FIG. 17). Thus, a long axis LA and two short axes SA1, SA2 can be created. For non-dividing cells, this could be a single line (e.g., short axis SA1) perpendicular to the line along the long axis LA of the nucleus 3 or cell 1. To create closed graphics, lines connecting (connecting lines CL1, CL2) the endpoints of the two perpendicular lines (short axes SA1, SA2) can be drawn in an intermediate step 4b (see FIG. 18). Holes in the mask image can be filled in an intermediate step 4c to thus obtain a linear mask (see FIG. 19), and a mask bar MB can be created and the mask bar MB can be added to the mask image in an intermediate step 4d. For non-dividing cells, the nucleus 3 can be added to the mask image using the same steps.

The isolated cytoplasm channel ("green channel") can be obtained in an intermediate step 5a of a main step 5. For example, FIG. 20 shows an original image, an inverted black-white-image, and a schematic drawing of a cell. In an intermediate step 5b, two-level Otsu automatic thresholding can be performed to isolate the brighter chromosome region 7 and the next brightest cytoplasm intensity plateau. In some implementations, this thresholding can include several sub-steps 5bi to 5bvii. A cytoplasm channel can be a detection channel of a detection device representing or detecting substances or molecules situated in the cytoplasm 2 which were previously tagged with a fluorescent marker. This two-level Otsu technique enables the separation of two regions in a single channel of the image that are comprised of different intensity plateaus relative to one another, with one being brighter and one being dimmer. In other samples, these regions may exist in separate channels that were isolated from one another during acquisition. For example, the chromosomes and the cytoplasm can be images in two separate channels. In this case, it is likely that one-level Otsu automatic thresholding in each of the two channels would give a similar outcome.

Figure 24:
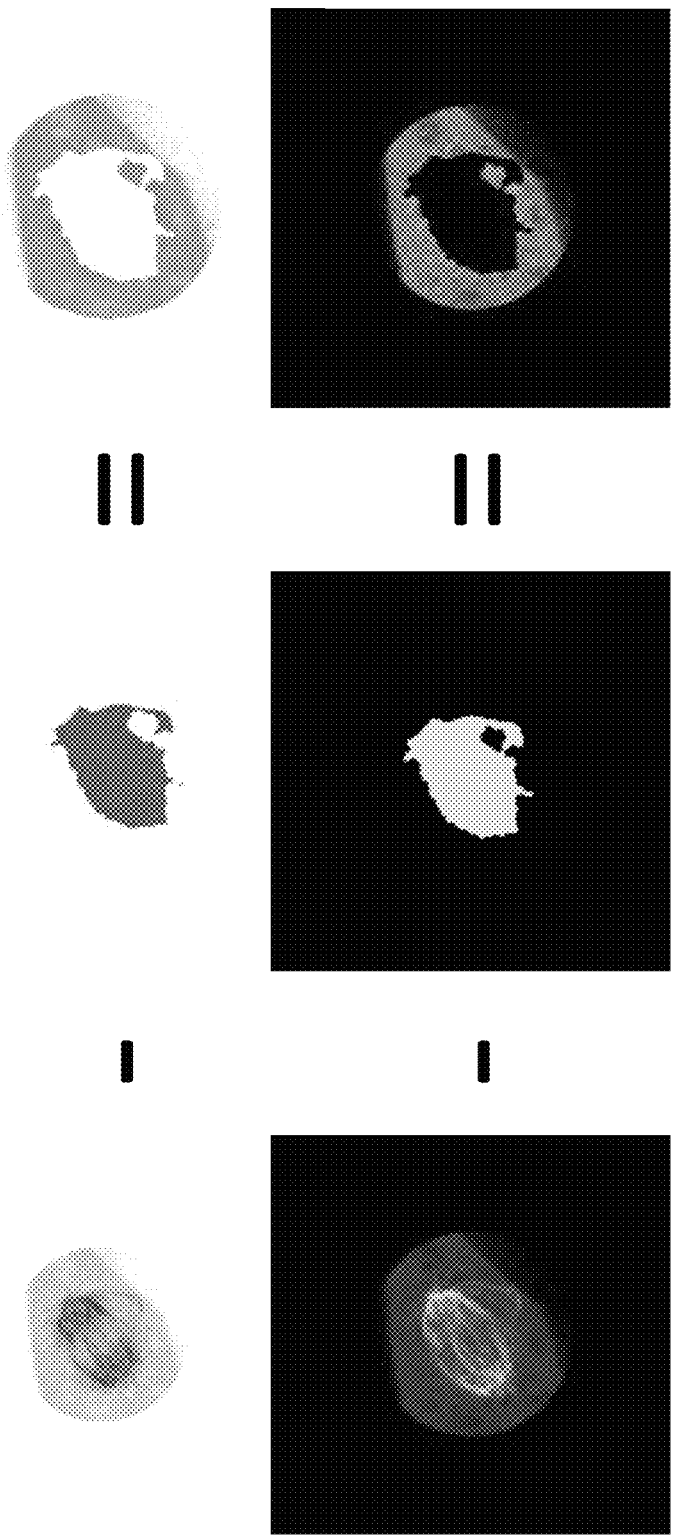
FIG. 24 is a schematic drawing illustrating a fifth step of a 2-level Otsu automatic thresholding and showing the subtraction of the mask obtained in the fourth step from the image provided by the selected green channel and generating a "subtraction image."

In a sub-step 5bi, an automatic threshold can be applied to the green channel. In this embodiment, the Otsu method can be used, but the techniques that worked best for a particular set of images can be used instead (see FIG. 21 showing a raw image and inverted black-white-image). The small particles can be scrapped to clean up the image in a sub-step 5bii and to perform the morphological "close" operation to fill holes and smooth edges in a sub-step 5biii (see FIG. 22 showing a raw image and inverted black-white-image). The image obtained from sub-step 5biii can be dilated slightly to expand the mask image in order to fully cover the brightest pixel or image region in a sub-step 5biv (see FIG. 23 showing a raw image and an inverted black-white-image). The chromosome mask from the green channel image can be subtracted in a sub-step 5bv (see FIG. 24, with the upper row showing inverted black-white-images and the lower row showing raw images).

An automatic threshold can be applied to the green channel using the Otsu method in a sub-step 5bvi (see FIG. 25, with the upper row showing inverted black-white-images, and the lower row showing raw images). The morphological "close" operation can be performed to fill holes and to smooth edges to produce the cytoplasm mask image in a sub-step 5bvii (see FIG. 26, with the upper row showing inverted black-white-images, and the lower row showing raw images).

In addition to bi-level thresholding techniques, multilevel thresholding techniques also can be used to identify features in the cell. With multilevel thresholding techniques, pixels of an image can be divided into several classes, rather than into just two bins, with pixels having gray levels within a specific range belonging to the same class. This multilevel thresholding technique can determine more than one threshold for the given image and can segment the image into certain brightness regions that correspond to one background and several objects. Multilevel thresholding can be particularly suitable for images of objects with colored or complex backgrounds, on which bi-level thresholding may not produce satisfactory results.

Figure 27:
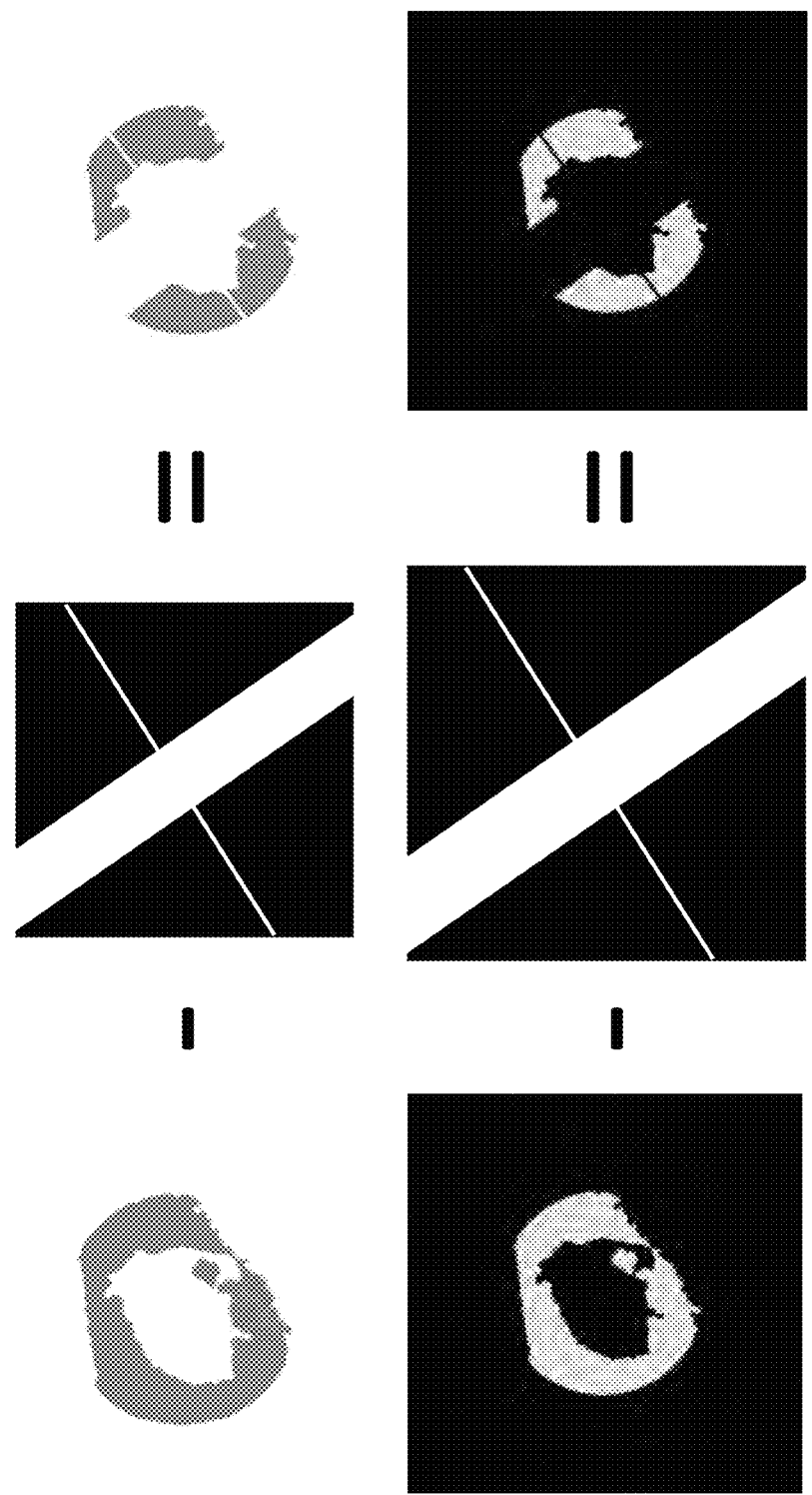
FIG. 27 is a schematic drawing of a subtraction of a mask including a masking bar and a long axis from an image according to FIG. 26 to produce a cytoplasm quadrant image.
Figure 29:
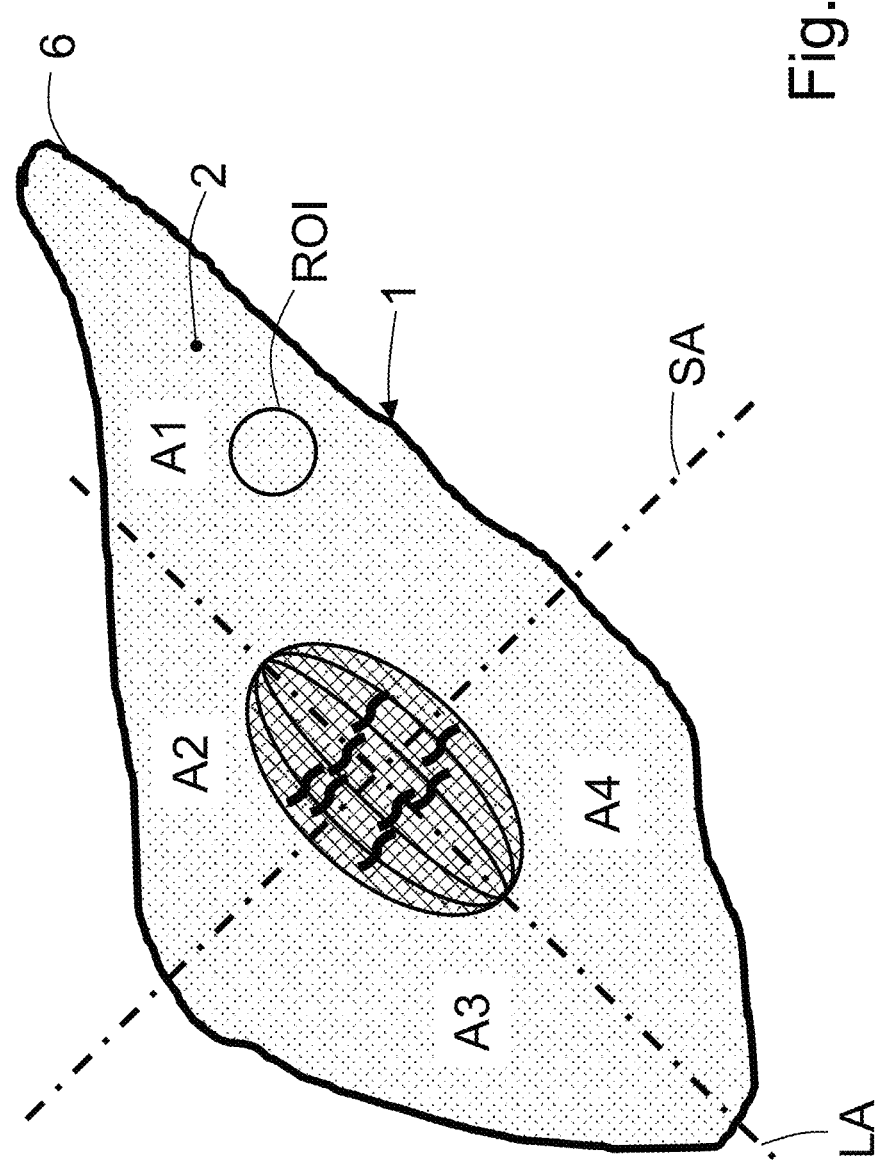
FIG. 29 is a schematic drawing of an imaged cell having a region of interest marked by a circle.

The linear mask image (see FIG. 19) can be subtracted from the cytoplasm mask image (see FIG. 26) to produce the cytoplasm quadrant image in an intermediate step 5c (see FIG. 27 showing raw and inverted black-white-images). The cytoplasm quadrant image (see FIG. 28) can be measured in an intermediate step 5d. In a sub-step 5di, the size of areas A1, A2, A3, A4 can be computed and stored in a data storage. The area data can be stored temporarily and then discarded after use in determining the quadrant to use. The centers of all areas A1 to A4 can be computed in a sub-step 5dii and their coordinates, for example, x-y-coordinates, can be saved. The results of sub-steps 5di and 5dii can be optionally presented as a table and displayed to a user. In an intermediate step 5e, a particular quadrant (e.g., the largest of the four quadrants in terms of area size) can be determined. In this example area, A1 is the largest in size. Other and/or additional criteria can be used in determining the quadrant (area) to use. The region of interest (ROI) can be placed and marked, for example, as a spot, at the center of the largest quadrant in an intermediate step 5f, thus the largest area A1 (see FIG. 28). In step 6, the coordinates and the extent of the region of interest (ROI) can be applied and shown in the image of the cell 1 (see FIG. 29). The ROI can have a circular, elliptical, quadrilateral, or arbitrary shape. This optional step can be useful for the user to confirm that the spot was placed correctly. In other implementations, the ROI can be placed in a quadrant other than the largest quadrant.

Figure 30:
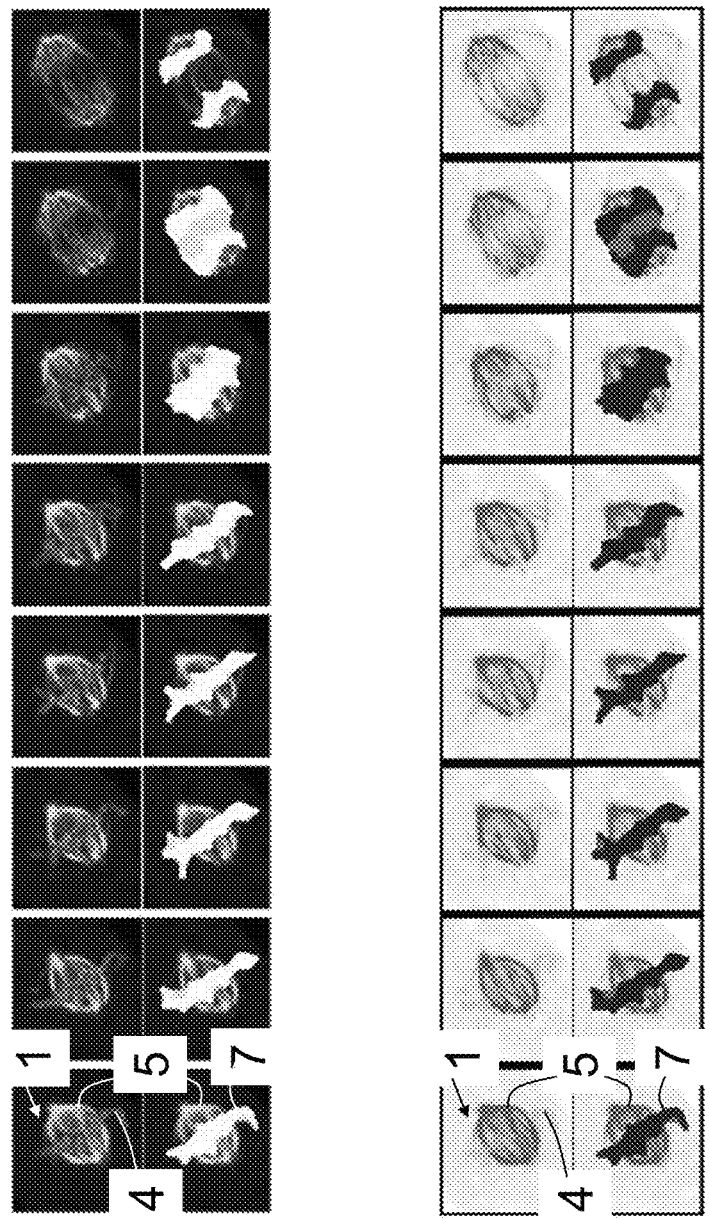
FIG. 30 is a schematic drawing (in raw and inverted images) of a sequence of a biological cell during mitosis beginning from metaphase until anaphase, while anaphase is automatically detected in a state as shown in the most right image of the sequence, with upper rows showing spindle apparatus and single chromosomes and chromatids respectively, and lower rows shows corresponding images in which the image data of chromosomes/chromatides are merged.

In FIG. 30, an image sequence of a dividing cell 1 is shown up to the point where anaphase is detected (most right image). In the process outlined above, the placement of the ROI occurs on the last image of this sequence. FIG. 30 shows the sequence in raw images in the upper image block. Images of the upper row of raw images show chromosomes/chromatids 4 and microtubule of spindle apparatus 5. The lower row of the color image block show merged chromatid data 7 and the span between the Chromatid regions as filled regions. The lower block of images are inverted images of the raw images of the upper block.

Although the novel techniques of the present disclosure have been illustrated using the particular case of a dividing cell during anaphase, the techniques are not limited to such cells and can be used to automatically define regions of interest in arbitrary cells that are not undergoing division.

Furthermore, the novel techniques of the present disclosure can be applied to cells having arbitrary shape. For example, in the case of a round cell, an arbitrary axis could be defined as a primary axis and then a secondary axis could be defined based on the defined primary axis. In another example, an axis for a cell (of any shape, including circular) could be defined based on structures within the cell (e.g., the nucleus).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, solid state drives, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) or light emitting diode (LED) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback or notification, e.g., email or text message; and input from the user can be received in any form, including acoustic, speech, or tactile input, email or text message.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the implementations.

What is claimed is:

1. A method for identifying a region of interest in an image of a biological cell, the method comprising:

detecting a primary axis of a structure of the biological cell;

defining a first section line along the detected primary axis;

detecting at least one secondary axis of the structure of the biological cell;

defining a second section line along each of the at least one secondary axes;

based on the second section line along each of the at least one secondary axes and the first section line along the detected primary axis, dividing a cytoplasm of the cell into a plurality of areas;

determining a geometric feature of each of the areas;

selecting one of the areas according to predefined criteria;

analyzing image data of the selected area and comparing the image data with the predefined criteria to identify regions that comply with the predefined criteria; and selecting at least one area complying with the predefined criteria to a pre-defined degree as the region of interest.

2. The method of claim 1, wherein the primary axis is a long axis of the structure of the cell and the secondary axis is a short axis of the structure of the cell.

3. The method of claim 1, wherein the structure of the cell includes a nucleus of the cell.

4. The method of claim 1, wherein the structure of the cell includes an outer membrane of the cell.

5. The method of claim 1, wherein detecting the at least one secondary axis includes:

identifying and measuring the structure of the cell, and defining the at least one secondary axis along the smallest extension of the structure of the cell.

6. The method of claim 1, further comprising detecting two secondary axes, wherein the detecting includes:

identifying centers of regions created by merging image data of chromosomes/chromatids of a nucleus of the cell, and defining a quadrilateral extending between at least two secondary axes as a masking bar.

7. The method of claim 1, wherein detecting the primary axis includes:

extending an axis perpendicular to the at least one secondary axis until both ends of the axis cross an outer membrane of the cell, and selecting the axis with the greatest length as the primary axis.

8. The method of claim 1, wherein detecting the primary axis includes fitting a line through centers of detected sub regions of a nucleus of the biological cell.

9. The method of claim 1, further comprising marking the selected region of interest in an image of the biological cell.

10. The method of claim 1, wherein the plurality of areas includes at least four areas.

11. The method of claim 1, further comprising performing a FRAP-experiment on the biological cell in the selected region of interest.

12. A microscope system comprising:

a detection unit configured for detecting images of biological cells; and an analysis unit, wherein the analysis unit is configured for:

detecting a primary axis in a structure of the biological cell;

defining a first section line along the detected primary axis, detecting at least one secondary axis of the structure of the biological cell;

defining a second section line along each of the at least one secondary axes;

based on the second section lines along each of the at least one secondary axes and the first section line along the detected primary axis, dividing a cytoplasm of the cell into a plurality of areas;

determining a geometric feature for each of the areas;

selecting one of the areas according to predefined criteria;

analyzing image data of the selected area and comparing image data with the predefined criteria to identify at least one region that complies with the predefined criteria; and selecting the at least one region complying with the predefined criteria to a pre-defined degree as a region of interest.

13. The microscope system of claim 12, wherein the structure of the cell includes a nucleus of the cell.

14. The microscope system of claim 12, wherein the structure of the cell includes an outer membrane of the cell.

15. The microscope system of claim 12, wherein detecting the at least one secondary axis includes:

identifying and measuring the structure of the cell; and defining the at least one secondary axis along the smallest extension of the structure of the cell.

16. The microscope system of claim 12, wherein detecting the at least one secondary axis includes:

detecting two secondary axes by identifying centers of regions created by merging image data of chromosomes/chromatids of a nucleus of the cell, and defining a quadrilateral extending between at the two secondary axes as a masking bar.

17. The microscope system of claim 12, wherein detecting the primary axis includes:

extending an axis perpendicular to the at least one secondary axis until both ends of the axis cross an outer membrane of the cell, and selecting the axis with the greatest length as the primary axis.

18. The microscope system of claim 12, wherein detecting the primary axis includes fitting a line through centers of detected sub regions of a nucleus of the biological cell.

19. The microscope system of claim 12, wherein the analysis unit is further configured for marking the selected region of interest in an image of the biological cell.

20. The microscope system of claim 12, wherein the plurality of areas includes at least four areas.

* * * * *